US009122216B2

(12) United States Patent
Park et al.

(10) Patent No.: US 9,122,216 B2
(45) Date of Patent: Sep. 1, 2015

(54) IMAGE FORMING APPARATUS, HOST APPARATUS, SERVER, AND METHOD OF PERFORMING IMAGE FORMING JOB THEREOF

(71) Applicant: Samsung Electronics Co., Ltd., Suwon-si, Gyeonggi-do (KR)

(72) Inventors: Jin-kyu Park, Suwon-si (KR); Jin-hwi Jun, Suwon-si (KR); Jung-ho Bang, Yongin-si (KR)

(73) Assignee: SAMSUNG ELECTRONICS CO., LTD., Suwon-Si (KR)

( * ) Notice: Subject to any disclaimer, the term of this patent is extended or adjusted under 35 U.S.C. 154(b) by 0 days.

(21) Appl. No.: 14/028,865

(22) Filed: Sep. 17, 2013

(65) Prior Publication Data

US 2014/0079428 A1    Mar. 20, 2014

(30) Foreign Application Priority Data

Sep. 18, 2012    (KR) .................. 10-2012-0103470

(51) Int. Cl.
*G03G 15/00*    (2006.01)
*H04N 1/00*    (2006.01)
*G06F 3/12*    (2006.01)

(52) U.S. Cl.
CPC ........ *G03G 15/5004* (2013.01); *G03G 15/5075* (2013.01); *G06F 3/1221* (2013.01); *G06F 3/1229* (2013.01); *G06F 3/1261* (2013.01); *G06F 3/1285* (2013.01); *H04N 1/00896* (2013.01); *H04N 1/00954* (2013.01); *G03G 2215/00109* (2013.01); *G06F 3/1213* (2013.01); *G06F 3/1288* (2013.01);

(Continued)

(58) Field of Classification Search
CPC .......... G03G 15/5004; G03G 15/5075; G03G 15/5083; G03G 15/5087; G03G 2215/00109; G03G 2215/00133
USPC ....................................................... 399/8, 82
See application file for complete search history.

(56) References Cited

U.S. PATENT DOCUMENTS

2004/0004732 A1    1/2004    Takeda et al.
2008/0003033 A1*   1/2008    Aizawa ........................... 400/62
(Continued)

FOREIGN PATENT DOCUMENTS

EP    1035499    9/2000
JP    07-098638    4/1995

OTHER PUBLICATIONS

Search Report and Written opinion dated Jan. 29, 2014 issued by the ISA for International Application No. PCT/KR2013/008388.

(Continued)

*Primary Examiner* — Benjamin Schmitt
(74) *Attorney, Agent, or Firm* — Staas & Halsey LLP

(57) ABSTRACT

An image forming apparatus includes a storage unit, an interface unit which is connected to a host apparatus and at least one of other image forming apparatuses, an image forming unit which prints image data received through the interface unit, and a controller which, if image data is received when the image forming apparatus is in a normal mode, controls the image forming unit to perform an image forming job using the image data, and if the image data is received when the image forming apparatus is in a power saving mode, controls the interface unit to transmit the image data to another image forming apparatus so that the another image forming apparatus performs an image forming job.

15 Claims, 29 Drawing Sheets

(52) U.S. Cl.
CPC ..... *G06F 3/1291* (2013.01); *H04N 2201/0082* (2013.01); *H04N 2201/0094* (2013.01); *Y02B 60/1271* (2013.01)

(56) References Cited

U.S. PATENT DOCUMENTS

| | | |
|---|---|---|
| 2008/0158574 A1 | 7/2008 | Sugiyama |
| 2009/0073481 A1 | 3/2009 | Ferlitsch |
| 2009/0165012 A1 | 6/2009 | Corona |
| 2011/0058822 A1 | 3/2011 | Shioyasu et al. |
| 2011/0060929 A1 | 3/2011 | Park et al. |
| 2011/0228304 A1 | 9/2011 | Kuwano |
| 2012/0075651 A1 | 3/2012 | Sasase |
| 2012/0218597 A1 | 8/2012 | Hashimoto |

OTHER PUBLICATIONS

European Search Report dated Feb. 3, 2014 issued in EP Application No. 13184855.8.

* cited by examiner

2521

POWER IS NOT BEING SUPPLIED
TO SCANNING UNIT

| | ON | OFF |
|---|---|---|
| POWER SUPPLY STATE | | |
| PAPER FEEDING UNIT | ☑ | ☐ |
| PAPER DISCHARGING UNIT | ☑ | ☐ |
| FUSING UNIT | ☑ | ☐ |
| SCANNING UNIT | ☐ | ☑ |
| ⋮ | | |

```
* CAUTION *

PAPER IS JAMMED IN PAPER FEEDING UNIT
   POWER SUPPLY TO PAPER FEEDING
UNIT WILL BE CUT OFF, SO PLEASE REMOVE
          JAMMED PAPER.
```

IMAGE FORMING APPARATUS, HOST APPARATUS, SERVER, AND METHOD OF PERFORMING IMAGE FORMING JOB THEREOF

CROSS-REFERENCE TO RELATED APPLICATIONS

This application claims the benefit of priority under 35 U.S.C. §119 from Korean Patent Application No. 2012-0103470, filed in the Korean Intellectual Property Office on Sep. 18, 2012, the content of which is incorporated herein by reference in its entirety.

BACKGROUND OF THE INVENTION

1. Field of the Invention

The present general inventive concept relates to an image forming apparatus, a host apparatus, a server, and a method of performing an image forming job thereof, and more particularly, to an image forming apparatus which is capable of reducing power consumption, a host apparatus, a server, and a method of performing an image forming job thereof.

2. Description of the Related Art

An image forming apparatus means an apparatus which performs such jobs as generating, printing, receiving, and transmitting image data, and examples of an image forming apparatus include a printer, a scanner, a copy machine, a fax machine, and a Multi-Function Peripheral (MFP) which performs the above functions in a single device. For the purposes of this application, a host apparatus, for example, a general purpose computer, is not an image forming apparatus.

Recently, there has been an effort to reduce power consumption both in a normal operation mode, in which an image forming apparatus operates normally, and in a power saving operation mode, in which an image forming apparatus is not performing any particular operation.

In particular, if a command for an image forming job is received from a host apparatus while an image forming apparatus is in a power saving mode, the image forming apparatus consumes a considerable amount of power to "wake up" components (for example, a printing unit, a scanning unit, and so on) of the image forming apparatus while converting the power saving mode to an operation mode.

However, even if there is a first image forming apparatus in a normal mode among other image forming apparatuses in power saving mode connected to the first image forming apparatus, if one of the other image forming apparatus receives a command for an image forming job it will operate in the power saving mode after being "woken up." That is, the image forming apparatus in the power saving mode will consume a considerable amount of power as it is unnecessarily converted from the power saving mode to the normal mode.

SUMMARY

The present general inventive concept provides a host apparatus, a server, a method of performing an imaging job, and an image forming apparatus which is capable of reducing power consumption by preventing unnecessary mode conversion, that is, if an image forming job is received in a power saving mode of the image forming apparatus, the image forming apparatus performs the image forming job using another image forming apparatus in a normal mode.

Additional features and utilities of the present general inventive concept will be set forth in part in the description which follows and, in part, will be obvious from the description, or may be learned by practice of the general inventive concept.

The foregoing and/or other features and utilities of the present general inventive concept may be achieved by providing an image forming apparatus including a storage unit, an interface unit which is connected to a host apparatus and at least one of other image forming apparatuses, an image forming unit which prints image data received through the interface unit, and a controller which, if image data is received from the host apparatus when the image forming apparatus is in a normal mode, controls the image forming unit to perform an image forming job using the image data, and if the image data is received from the host apparatus when the image forming apparatus is in a power saving mode, controls the interface unit to transmit the image data to another image forming apparatus which is presently in a normal mode so that the another image forming apparatus which is presently in a normal mode performs an image forming job.

The control unit, if the image data is received from the host apparatus when the image forming apparatus is in the power saving mode, may control the interface unit to analyze information regarding other image forming apparatuses which are connected through the interface unit, search for image forming apparatuses which satisfy predetermined conditions, and transmit the image data to another image forming apparatus which operates in a normal mode from among the searched image forming apparatuses.

The predetermined conditions may include at least one of a warming-up state, information on usage of consumables, amount of jobs waiting to be performed, and an expected job processing time.

The controller may check an amount of jobs waiting to be performed in another image forming apparatus which is presently in a normal mode, and if the amount of jobs waiting to be performed is less than a threshold level, may control the interface unit to transmit the image data to the other image forming apparatus which is presently in a normal mode. If the amount of jobs waiting to be performed exceeds a threshold level, the controller may convert the operation mode of the image forming apparatus from the power saving mode to the normal mode and perform the image forming job using the image data.

If the image data is received from the host apparatus when the image forming apparatus is in the power saving mode, the controller may search for another image forming apparatus which is presently in a normal mode from among other image forming apparatuses connected to the image forming apparatus via a network. If a plurality of other image forming apparatuses which are in a normal mode are searched, the controller may check the amount of jobs waiting to be performed in each of the image forming apparatuses and control the interface unit to transmit the image data to another image forming apparatus having the least amount of jobs waiting to be performed.

If the image forming apparatus is in the power saving mode and the image data is received, the controller may search for another image forming apparatus which is presently in a normal mode from among other image forming apparatuses which are connected to the image forming apparatus via a network, and if another image forming apparatus which is presently in a normal mode is not found, may convert the operation mode of the image forming apparatus from the power saving mode to the normal mode and perform the image forming job using the image data.

If the image forming apparatus is in the power saving mode and the image data is received from the host apparatus, the controller may search for other image forming apparatuses which satisfy predetermined conditions stored in the storage unit from among other image forming apparatuses connected through the interface unit and control the interface unit to transmit the image data to another image forming apparatus which operates in a normal mode from among the other searched image forming apparatuses. The predetermined conditions may include at least one of a user authentication state, user setting information, apparatus location, and job performance capability.

If the power saving mode includes a plurality of power saving modes, and the image data is received while the image forming apparatus is in a power saving mode, the controller may determine a type of the power saving mode of the image forming apparatus, and if it is determined that the current power saving mode of the image forming apparatus is one or more particular predetermined power saving modes, may search for another image forming apparatus which is presently in a normal mode from among other image forming apparatuses which are connected to the image forming apparatus via a network, and control the interface unit to transmit the image data to the image forming apparatus which is presently in a normal mode.

The step of transmitting image data to another image forming apparatus which is presently in a normal mode when the first image forming apparatus is in power saving mode may be executed only when the first image forming apparatus enters a predetermined mode among the power saving modes.

The storage unit may include a first memory and a second memory. The controller may include a main CPU which operates in a normal mode and uses the first memory, and a sub CPU which operates in a power saving mode and uses the second memory.

The image forming apparatus may further include a plurality of function units to perform an image forming job, a power state sensor to sense a power supply state of the plurality of function units, and a display unit. The controller may determine a power supply state regarding the plurality of function units through the power state sensor and control the display unit to generate and display a UI informing the determined power supply state.

The foregoing and/or other features and utilities of the present general inventive concept may also be achieved by providing a method of performing a job in an image forming apparatus, the method including receiving image data to perform an image forming job, a first execution step of performing an image forming job using the image data if the image forming apparatus is in a normal mode, and a second execution step of performing an image forming job by transmitting the image data to another image forming apparatus which is presently in a normal mode from among at least one image forming apparatus which is connected to the image forming apparatus if the image forming apparatus is in a power saving mode.

The second execution step may include, if the image forming apparatus is in the power saving mode and the image data is received, analyzing information regarding other image forming apparatuses connected through the interface unit, searching other image forming apparatuses which satisfy predetermined conditions according to the analysis result, and transmitting the image data to another image forming apparatus which operates in a normal mode from among the searched other image forming apparatuses.

The predetermined conditions may include at least one of a warming-up state, information on usage of consumables, amount of jobs waiting to be performed, and an expected job processing time.

The second execution step may include, if another image forming apparatus which is presently in a normal mode is found, checking an amount of jobs waiting to be performed in the other image forming apparatus, and if the amount of jobs waiting to be performed is less than a threshold level, transmitting the image data to the other image forming apparatuses, and if the amount of jobs waiting to be performed exceeds a threshold level, converting the operation mode of the image forming apparatus from the power saving mode to the normal mode and performing the image forming job using the image data.

The second execution step may include, if the image forming apparatus is in the power saving mode and the image data is received, searching for another image forming apparatus which is presently in a normal mode from among other image forming apparatuses which are connected to the image forming apparatus via a network, if a plurality of other image forming apparatuses which are in a normal mode are searched, checking amount of jobs waiting to be performed in each of the image forming apparatuses, and selecting another image forming apparatus having the least amount of jobs waiting to be performed and transmitting the image data to the another image forming apparatus.

The second execution step may include searching another image forming apparatus which is presently in a normal mode from among other image forming apparatuses which are connected to the image forming apparatus via a network, and if another image forming apparatus which is presently in a normal mode is not searched, converting the operation mode of the image forming apparatus from the power saving mode to the normal mode and performing the image forming job using the image data.

The second execution step may include, if the image forming apparatus is the power saving mode and the image data is received, searching other image forming apparatuses which satisfy predetermined conditions stored in the storage unit from among other image forming apparatuses connected to the image forming apparatus, and transmitting the image data to another image forming apparatus which operates in a normal mode from among the searched other image forming apparatuses, and the conditions may include at least one of a user authentication state, user setting information, apparatus location, and job performance capability.

If the power saving mode includes a plurality of power saving modes, and the image data is received while the image forming apparatus is in the power saving mode, the second execution step may include determining a type of the power saving mode of the image forming apparatus, if it is determined that the current power saving mode of the image forming apparatus is a predetermined power saving mode, searching another image forming apparatus which is presently in a normal mode from among other image forming apparatuses which are connected to the image forming apparatus, and transmitting the image data to the image forming apparatus which is presently in a normal mode.

The second execution step may be performed only when a predetermined mode form among power saving modes of the image forming apparatus is entered into.

The first execution step may be performed by a main CPU which operates using the first memory, and the second execution step may be performed by a sub CPU which operates using the second memory.

The foregoing and/or other features and utilities of the present general inventive concept may also be achieved by providing a host apparatus including an interface unit which is connected to an image forming apparatus which operates in one of a normal mode and a power saving mode, an input unit which receives a job execution command, and a controller which, if the job execution command is received and it is determined that the image forming apparatus operates in the normal mode by checking a mode of the image forming apparatus, transmits image data to the image forming apparatus, and if it is determined that the image forming apparatus operates in the power saving mode, transmits the image data to another image forming apparatus which operates in a normal mode.

The foregoing and/or other features and utilities of the present general inventive concept may also be achieved by providing a method of performing a job in a host apparatus which is connected to an image forming apparatus and operated, the method including receiving image data to perform an image forming job, if the image forming apparatus operates in a normal mode, transmitting the image data to the image forming apparatus, and if the image forming apparatus operates in a power saving mode, searching another image forming apparatus which operates in a normal mode from among other image forming apparatuses connected to the host apparatus and transmitting the image data to another image forming apparatus in a normal mode.

The foregoing and/or other features and utilities of the present general inventive concept may also be achieved by providing a server which performs an image forming job, the server including an interface unit which is connected to at least one image forming apparatus and a host apparatus, a storage unit which stores state information of the at least one image forming apparatus, and a controller which, if image data to perform an image forming job is received from the host apparatus, determines an operation mode of an image forming apparatus which is set as default with respect to the host apparatus based on state information stored in the storage unit, if an operation mode of the image forming apparatus which is set as default is a normal mode, controls the interface unit to transmit the image data to the image forming apparatus which is set as default, and if an operation mode of the image forming apparatus which is set as default is a power saving mode, to transmit the image data to another image forming apparatus which operates in a normal mode.

The foregoing and/or other features and utilities of the present general inventive concept may also be achieved by providing a job performing method in a server which performs an image forming job, the method including receiving image data to perform an image forming job from a host apparatus, determining an operation mode of an image forming apparatus which is set as default with respect to the host apparatus, and if an operation mode of the image forming apparatus which is set as default is a normal mode, transmitting the image data to the image forming apparatus which is set as default, and if an operation mode of the image forming apparatus which is set as default is a power saving mode, transmitting the image data to another image forming apparatus which operates in a normal mode.

The foregoing and/or other features and utilities of the present general inventive concept may also be achieved by providing a non-transitory computer-readable medium to contain computer-readable codes as program to execute a method of handling an image forming job in an image forming apparatus, the method comprising receiving image data to perform an image forming job; performing an image forming job using the image data when the image forming apparatus is in a normal mode; and performing an image forming job by transmitting the image data to another image forming apparatus which is in a normal mode from among at least one image forming apparatus which is connected to the image forming apparatus when the image forming apparatus is in a power saving mode.

The foregoing and/or other features and utilities of the present general inventive concept may also be achieved by providing an image forming apparatus comprising an image forming unit to print image data, and a controller to transmit the image data to an external image forming apparatus when the image data is received in a power saving mode.

The controller may be configured such that it does not change the power saving mode to the normal mode such the data is not printed by the image forming unit when the print data is received in the power saving mode.

The controller may be configured such that it controls the image forming unit to print the image data when the image data is received in a normal mode.

BRIEF DESCRIPTION OF THE DRAWINGS

These and/or other features and utilities of the present general inventive concept will become apparent and more readily appreciated from the following description of the embodiments, taken in conjunction with the accompanying drawings of which:

FIGS. 26 to 29 are views illustrating a UI to guide a power supply state of an image forming apparatus according to an exemplary embodiment of the present general inventive concept.

DETAILED DESCRIPTION OF THE EMBODIMENTS

Figure 1:
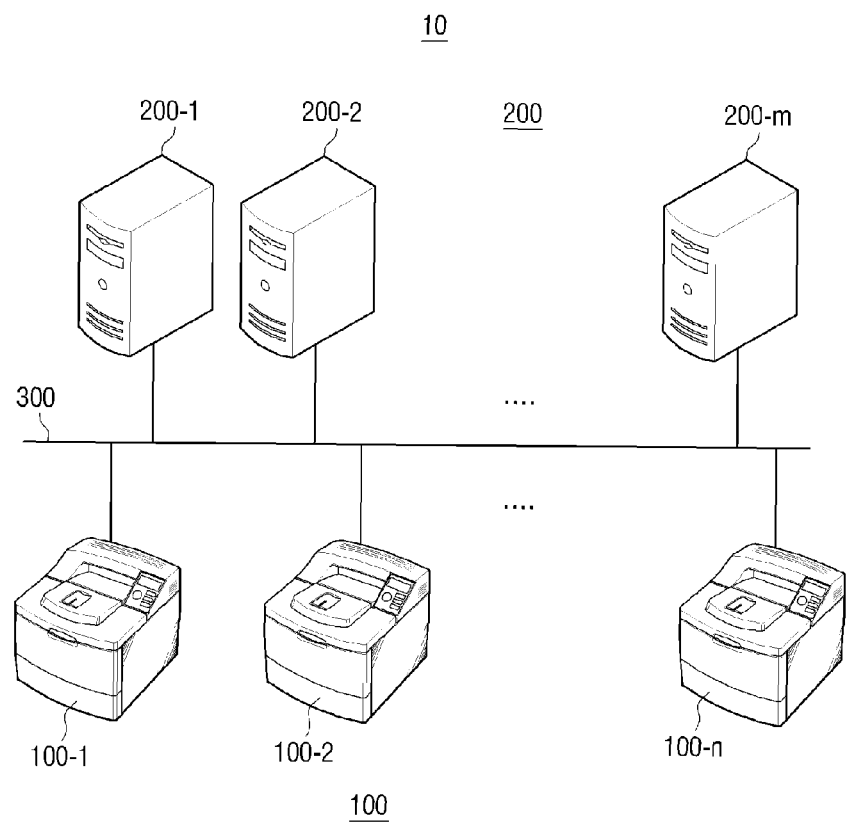
FIG. 1 is a view illustrating an image forming system according to an exemplary embodiment of the present general inventive concept.

Reference will now be made in detail to the embodiments of the present general inventive concept, examples of which are illustrated in the accompanying drawings, wherein like reference numerals refer to the like elements throughout. The embodiments are described below in order to explain the present general inventive concept by referring to the figures.

FIG. 1 is a view illustrating a system according to an exemplary embodiment. As illustrated in FIG. 1, an image forming apparatus system 10 includes n image forming apparatuses 100 (100-1, 100-2, . . . , 100-n), and m host apparatuses 200 (200-1, 200-2, . . . , 200-m) connected together through a network 300 such that communication is available.

Herein, the network 300 may be realized, for example, as a LAN, a sharer such as a HUB, or an Internet network.

In addition, the image forming apparatus 100 may be realized generally as a printer, a copy machine, a scanner, a fax machine, and a Multi-Function Peripheral (MFP) which performs the above functions in a single device, and the host apparatus 200 may be realized as various electronic apparatuses such as, for example, a desktop PC, a tablet PC, a notebook PC, a smart phone, or a smart TV. In particular, the image forming apparatus system 10 may include a plurality of image forming apparatuses 100, but the host apparatus 200 may include at least one image forming apparatus 100.

The host apparatus 200 receives a command for an image forming job from a user. The image forming job may be at least one of various image forming jobs such as printing, scanning, faxing, and so on.

In addition, the host apparatus 200 generates image data in a format which can be used in the image forming apparatus 100 according to the received command for an image forming job. The image data may include a job command and print data regarding the image forming job. The job command may include information regarding the type of the image forming job, and the print data may include information regarding an image to be printed.

Subsequently, the host apparatus 200 transmits the generated image data to an image forming apparatus 100 through a network 300. In this case, the image forming apparatus 100 which receives the image data may be an image forming apparatus 100 (for example, a basic printer) which is set as a default recipient in the host apparatus 200.

If the image forming apparatus 100 receives image data, the image forming apparatus 100 performs an image forming job according to an operation mode.

Specifically, if image data is received from the host apparatus 200 while the image forming apparatus 100 is in a normal mode, the image forming apparatus 100 performs an image forming job using the image data.

However, if image data is received from the host apparatus 200 while the image forming apparatus 100 is in a power saving mode, the image forming apparatus 100 searches other image forming apparatuses connected to the network 300 for another image forming apparatus which is presently in a normal mode.

If an image forming apparatus in a normal mode is found among the other image forming apparatuses connected to the network 300, the image forming apparatus 100 transmits the image data to the other image forming apparatus which is presently in a normal mode.

However, if no other image forming apparatus in a normal mode is found among the other image forming apparatuses connected to the network 300, the image forming apparatus 100 converts its operation mode from a power saving mode to a normal mode and performs the required image forming job using the received image data.

In addition, the image forming apparatus 100 may transmit the image data to another image forming apparatus which is presently in a normal mode depending upon the amount of jobs designated to be performed on the other image forming apparatus. Specifically, even if there is another image forming apparatus which is presently in a normal mode among the other image forming apparatuses connected to the network 300, the image forming apparatus 100 may convert the operation mode from a power saving mode to a normal mode and perform an image forming job using the image data when the amount of jobs waiting to be performed in the other image forming apparatus already in a normal mode exceeds a predetermined value. However, when the amount of jobs waiting to be performed in the other image forming apparatus in normal mode is less than a predetermined value, the image forming apparatus 100 may proceed to transmit the image data to the other image forming apparatus which is in normal mode.

As described above, if a request for an image forming job is received when the image forming apparatus 100 is in a power saving mode, the image forming job may be performed using another image forming apparatus which is presently in a normal mode without converting the operation mode of the first image forming apparatus 100 to a normal mode. Accordingly, the image forming apparatus 100 may reduce power consumption as an unnecessary wake-up operation is not performed.

Meanwhile, in the above exemplary embodiment, the image forming apparatus 100 receives an image forming job from the host apparatus 200, but this is only an example, and a command for an image forming job may be directly inputted to the image forming apparatus 100.

Hereinafter, the image forming apparatus 100 and the host apparatus 200 will be explained according to an exemplary embodiment, with reference to FIGS. 2 and 3.

Figure 2:
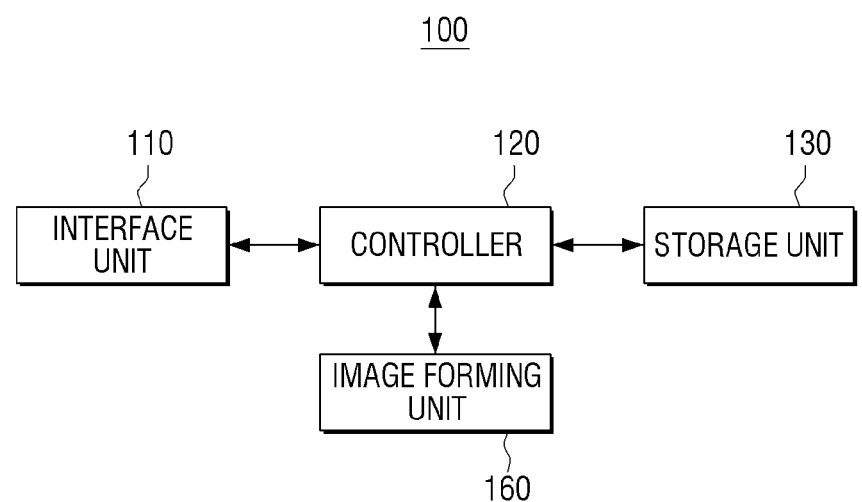
FIG. 2 is a block diagram illustrating a configuration of an image forming apparatus according to an exemplary embodiment of the present general inventive concept.

FIG. 2 is a block diagram briefly illustrating configuration of the image forming apparatus 100 according to an exemplary embodiment. As illustrated in FIG. 2, the image forming apparatus 100 comprises an interface unit 110, a controller 120, a storage unit 130, and an image forming unit 160.

The interface unit 110 performs communication with at least one of host apparatuses 200 (200-1, 200-2, . . . , 200-m) and other image forming apparatuses. In this case, the interface unit 110 may be realized as USB interface, a LAN, a wireless LAN, Bluetooth, a sharer such as HUB, an Internet network, and so on. In addition, the interface unit 110 may be realized as at least one module in order to perform communication with a plurality of external apparatuses.

In particular, the interface unit 110 may receive image data from the host apparatus 200 and transmit image data to another image forming apparatus.

The controller 120 controls overall operations of the image forming apparatus 100 using a program stored in the storage unit 130. In particular, the controller 120 may operate in one of a normal mode or a power saving mode as an operation mode. In this case, the normal mode refers to an operation mode in which a unit for performing an image forming job (for example, an image forming unit, a scanning unit, and so on) is "woken-up," and the power saving mode refers to an operation mode in which power supply to a unit for performing an image forming job is cut off or minimized in order to minimize power consumption when the image forming apparatus does not perform any job. In this case, the power saving mode may be divided into a plurality of power saving modes according to the type of unit for which power supply is cut for, the amount of power supply, stand-by time, and so on.

Thus, the controller 120 may handle an image forming job in different ways depending on the operation mode of an image forming apparatus.

Specifically, if the image forming apparatus 100 is in a normal mode and image data is received from the host apparatus 200, the controller 120 may perform an image forming job through the image forming unit 160 using the image data.

However, if the image forming apparatus 100 is in a power saving mode and image data is received from the host apparatus 200, the controller 120 may search for another image forming apparatus which is presently in a normal mode, and control the interface unit 110 to transmit the image data to the other image forming apparatus found to be in normal mode.

In this case, the controller 120 may search for another image forming apparatus which is presently in a normal mode by broadcasting a state confirmation message to other image forming apparatuses in order to check the mode and state of the other image forming apparatuses. In addition, the controller 120 may search for another image forming apparatus which is presently in a normal mode by requesting information regarding the type of the other image forming apparatuses from the host apparatus 200. In addition, the controller 120 may search for another image forming apparatus which is presently in a normal mode by requesting information regarding the type of the other image forming apparatuses from a server (not shown).

However, if another image forming apparatus which is presently in a normal mode is not found, the controller 120 controls the image forming unit 160 to convert its operation mode from a power saving mode to a normal mode and to perform the image forming job. In this case, the controller 120 may wake up only part of the configuration necessary to perform the image forming job without waking up all of configuration according to a received job command.

In addition, the controller 120 may perform an image forming job by checking the amount of jobs waiting to be performed in another image forming apparatus which is presently in a normal mode. Specifically, the controller 120 may receive information regarding the amount of jobs waiting to be performed directly from another image forming apparatus or through the host apparatus 200. In this case, the information regarding the amount of jobs waiting to be performed may be one or more of the number of jobs to be performed, the number of pages waiting to be printed, or the standby time.

In particular, if the amount of jobs waiting to be performed in another image forming apparatus which is presently in a normal mode is less than a threshold level, the controller 120 may transmit image data to the other image forming apparatus which is presently in a normal mode. However, if the amount of jobs waiting to be performed exceeds a threshold level, the controller 120 may convert the operation mode of the image forming apparatus 100 from a power saving mode to a normal mode, and control the image forming unit 160 to directly perform an image forming job using the image data.

In addition, if a plurality of image forming apparatuses which are in a normal mode are found, the controller 120 may check the amount of jobs waiting to be performed in each of the image forming apparatuses. The controller 120 may control the interface unit 110 to select the image forming apparatus which has the least amount of jobs waiting to be performed from among the plurality of image forming apparatuses which are in a normal mode and transmit the image data thereto.

In this case, if the amount of jobs waiting to be performed in each of the plurality of image forming apparatuses which are in a normal mode exceeds a threshold level, the controller 120 may control the image forming unit 160 to convert the operation mode of the image forming apparatus 100 from a power saving mode to a normal mode and directly perform an image forming job using the image data.

In addition, the controller 120 may control the interface unit 110 to search for other image forming apparatuses which satisfy predetermined conditions stored in the image forming apparatus 130 from among other image forming apparatuses connected through the interface unit 110 and transmit image data to another image forming apparatus which operates in a normal mode from among the searched image forming apparatuses.

In this case, the predetermined conditions may include at least one of a user authentication state, user setting information, apparatus location, and job performance capability. For example, if user A is authenticated, the controller 120 may search for another image forming apparatus corresponding to user A stored in the storage unit 130. In addition, the controller 120 may search only for another image forming apparatus which is set by a user and stored in the storage unit 130. In addition, the controller 120 may search only for another image forming apparatus within a predetermined scope based on information regarding location of image forming apparatuses which is stored in the storage unit 130. In addition, the controller 120 may search only for another image forming apparatus corresponding to the type of an image forming job using job performance capability of image forming apparatuses stored in the storage unit 130.

Further, the controller 120 may control the interface unit 100 to analyze information on other image forming apparatuses connected through the interface unit 110, search for other image forming apparatuses satisfying predetermined conditions, and transmit image data to another image forming apparatus which presently operates in a normal mode from among the searched image forming apparatuses. In this case, after receiving image data from the host apparatus 200, the controller 120 may receive information on other image forming apparatuses from the host apparatus 200 or each of the other image forming apparatuses.

Herein, the predetermined conditions may include at least one of a warming-up state, information on use of consumables, the amount of jobs waiting to be performed, or an expected job processing time. For example, the controller 120 may search for another image forming apparatus where configuration corresponding to an image forming job requested from a user is warmed-up by analyzing information regarding a warming-up state of each configuration of another image forming apparatus. In addition, the controller 120 may search for another image forming apparatus which may accommodate the amount of image forming jobs (for example, the number of print request pages) requested by a user by analyzing information on use of consumables (for example, the amount of usable toner) of another image forming apparatus. In addition, the controller 120 may search for another image forming apparatus in which the amount of jobs waiting to be performed or an expected job processing time is less than a predetermined value by receiving information on the amount of jobs waiting to be performed or an expected job processing time.

In addition, if a power saving mode consists of a plurality of power saving modes, the controller 120 determines the type of power saving mode of the current image forming apparatus 100, and if it is determined that the power saving mode of the current image forming apparatus 100 corresponds to a predetermined power saving mode, the controller 120 may control the interface unit to search for another image forming apparatus which is presently in a normal mode from among other image forming apparatuses connected through a network and transmit image data to another image forming apparatus which is presently in a normal mode.

Specifically, the power saving mode may be divided into a plurality of modes according to a time for which a signal to perform an image forming job is not received. In this case, the plurality of modes of the power saving mode may respectively comprise different types of configurations for regulating the amount of power provided among various components required to perform an image forming job, and may also have different standby power values. For example, the image forming apparatus 100 may have four steps of power saving modes as follows.

[First Power Saving Mode]

If a signal to perform an image forming job is not received through the interface unit 110 for a predetermined amount of time, for example, one hour, the image forming apparatus 100 presently in a normal mode may convert the operation mode from the normal mode to a first power saving mode.

In the first power saving mode, the controller 120 lowers an operation frequency of a volatile memory in the storage unit 130 to a minimum operation frequency, and lowers an operation frequency of a CPU in the controller 120 to a first operation frequency. For example, if the operation frequency of the volatile memory is 300 MHz, the minimum operation frequency of the volatile memory may be 133 MHz. In an exemplary embodiment, if the maximum operation frequency of the CPU is 600 MHz, the first operation frequency of the CPU may be 133 MHz. Accordingly, the power consumption of the image forming apparatus 100 in the first power saving mode may be approximately 1.3 W~1.4 W.

[Second Power Saving Mode]

In the first power saving mode, if an external signal to convert the operation mode to a normal mode (for example, image data received from the host apparatus 200) is not received for a predetermined amount of time, for example, two hours, the image forming apparatus 100 may convert the first power saving mode to a second power saving mode.

In the second power saving mode, the controller 120 performs a program jump so that a CPU operates using information copied in an internal memory, and converts a volatile memory from a normal operation mode to a self-refresh mode.

In this case, if an external memory to convert the second power saving mode to a normal mode is not received to the interface unit 110, the volatile memory may maintain the self-refresh mode even if an external signal is received.

Accordingly, the CPU operates by accessing a small-scale internal memory and thus, power consumption may be further reduced. As a result, the power consumption of the image forming apparatus 100 in the second power saving mode may be approximately 0.9 W~1 W.

[Third Power Saving Mode]

In the second power saving mode, if an external signal to convert the operation mode to a normal mode is not received for a predetermined amount of time, for example, three hours, the image forming apparatus may convert the second power saving mode to a third power saving mode.

In the third power saving mode, the controller 120 may lower the operation frequency of a CPU to a minimum operation frequency and cut off power supply to a function unit to perform an image forming job and an operation module, respectively. For example, if the first operation frequency of the CPU is 133 MHz, the minimum operation frequency of the CPU may be 33 MHz.

As the function unit and the operation module are turned off and the operation frequency of the CPU is lowered to the minimum operation frequency, power consumption may be reduced further than the second power saving mode. That is, the power consumption of the image forming apparatus 100 in the third power saving mode may be approximately 0.6 W~0.7 W.

Meanwhile, cut-off of power provided to the function unit may be performed in the second power saving mode. In addition, in the third power saving mode, the operation frequency of the interface unit 110 may be changed from 133 MHz to 33 MHz.

[Fourth Power Saving Mode]

In the third power saving mode, if an external signal to convert the operation mode to a normal mode is not received for a predetermined amount of time, for example, four hours, the image forming apparatus 100 may convert the third power saving mode to the fourth power saving mode.

In the fourth power saving mode, the controller 120 cuts off power provided to a volatile memory.

As the volatile memory is turned off, power consumption may be reduced further than the third power saving mode. That is, in the fourth power saving mode, the power consumption of the image forming apparatus 100 may be approximately 0.4 W~0.5 W. Accordingly, the entire power consumption of the image forming apparatus 100 in the fourth power saving mode may be reduced considerably, approximately less than 1 W.

The above-described various operation frequencies and power values are only exemplary, and the characteristics and the number of each component may be varied depending on the characteristics of the image forming apparatus 100. That is, the numbers are not limited to those recited in this specification.

In addition, in the above exemplary embodiment, the image forming apparatus has four steps of power saving modes, but this is only an example. An exemplary embodiment including a plurality of power saving modes other than the above-mentioned four steps may also be applied to the present invention. In this case, the characteristics, the number, the operation frequencies and the power values of components which operate in a plurality of power saving modes may be designed by those skilled in the related art.

If the image forming apparatus 100 has four steps of power saving modes as described above, the controller 120 may control the interface unit 110 to transmit image data to another image forming apparatus which is presently in a normal mode only when the current mode is the third power saving mode or the fourth power saving mode. If the current mode is the first power saving mode or the second power saving mode, the controller 120 may convert the operation mode from the power saving mode to a normal mode and perform an image forming job. If the mode is the first power saving mode or the second power saving mode, considerable power consumption does not occur even if the operation mode of the image forming apparatus 100 is converted from the power saving mode to the normal mode, and it does not take much time to wake up. However, if the mode is the third power saving mode or the fourth power saving mode, it is more beneficial to perform an image forming job using another image forming apparatus in terms of power consumption and wake-up time than converting the operation mode of the image forming apparatus 100.

Furthermore, the image forming apparatus 100 in a power saving mode may transmit image data to another image forming apparatus in a normal mode via a predetermined transmission mode, for example, an external apparatus transmission mode.

For example, if an external apparatus transmission mode is entered into through a UI displayed on the host apparatus 200 or the image forming apparatus 100, the controller 120 may transmit image data to another image forming apparatus which is presently in a normal mode as described above. Alternatively, if a user sets a specific time (for example, at dawn) for a predetermined mode to be entered into, the controller 120 may transmit image data to another image forming apparatus which is presently in a normal mode only at the specific time.

In the above exemplary embodiment, the controller 120 operates by one CPU, but this is only an example. The controller 120 may consist of a main CPU which operates in a normal mode and a sub CPU which operates in a power saving mode. In this case, if the image forming apparatus 100 is in a power saving mode, the operation of transmitting image data to another image forming apparatus which is presently in a normal mode may be realized by the sub CPU.

The storage unit 130 stores an operating system and various programs which are required to perform an image forming job. In particular, the storage unit 130 may comprise a first memory which operates in a normal mode and a second memory which operates in a power saving mode.

The first memory is a main memory which is used for operations in a normal mode and may be realized as a nonvolatile memory. For example, a Dynamic RAM (DRAM) may be used as the first memory, and the first memory may store a program, an application, and so on which may perform network communication in a normal mode.

The second memory may be used for operations in a power saving mode where operations are performed using less power than in a normal mode. For example, the second memory stores a program and an application which can support a power saving mode, and the second memory may be realized as, for example, a Static RAM (SRAM), a Synchronous Dynamic Random Access (SDRAM), a RAMBus, a DRAM, or a DDR-SDRAM.

In particular, the second memory stores network address information of the host apparatus 200 and one or more other image forming apparatuses to enable communication with the external host apparatus 200 and one or more other image forming apparatuses even in a power saving mode. In this case, the network address information may include, for example, information such as an IP address or a MAC address.

Further, the second memory may store information regarding an image forming apparatus which is available for each user in order to search for another image forming apparatus where image data is to be sent, and may store information regarding an image forming apparatus set by a user, location information regarding a host apparatus and another image forming apparatus, and information on job performance of another image forming apparatus in order to transmit image data in a power saving mode.

Meanwhile, the storage unit 130 may include a Read Only Memory (ROM) and a flash memory to store necessary codes in a normal mode.

The image forming unit 160 performs an image forming job using received image data. In particular, if the image forming apparatus operates in a normal mode and image data is received from the host apparatus 200, the image forming unit 160 performs an image forming job using the received image data.

As described above, if an image forming job is performed using an image forming apparatus, the unnecessary operation of waking up an image forming apparatus in a power saving mode to an operation mode can be prevented.

Figure 3:
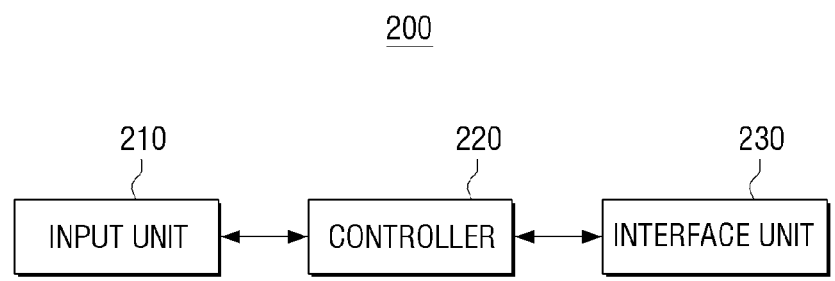
FIG. 3 is a block diagram illustrating a configuration of a host apparatus according to an exemplary embodiment of the present general inventive concept.

FIG. 3 is a block diagram briefly illustrating configuration of the host apparatus 200 according to an exemplary embodiment. As illustrated in FIG. 3, the host apparatus 200 includes an input unit 210, a controller 220, and an interface unit 230.

The input unit 210 receives a user command to perform an image forming job. In this case, the input unit 210 may be realized as various input apparatuses such as, for example, a keyboard, a mouse, or a touch screen.

The controller 220 generates image data according to an image forming job received through the input unit 210. In this case, the controller 220 may generate image data in a format which can be recognized by the image forming apparatus 100.

For example, if an image forming job requested by a user is a printing job, the controller 220 may convert a document file into image data which can be recognized by the image forming apparatus 100. Herein, the image data may be a printing language data such as, for example, a Postscript (PS), a Printer Control Language (PCL), etc., or a file such as PDF, XPS, BMP, JPG, etc., if the image forming apparatus 100 supports direct printing.

In addition, the controller 220 includes software (for example, a printer driver) to generate a job command to be recognizable by the image forming apparatus 100, and the software included in the controller 220 may include a PJL generator (not shown) if a command to generate a job command is PJL. The command to generate a job command is not limited to only PJL but can also include PCL, PS, etc., and the controller 120 may generate a job command using a corresponding command generating unit.

The interface unit 230 performs communication with the external image forming apparatus 100 or a server (not shown). In this case, the interface unit 230 may be realized, for example, as a USB interface, LAN, wireless LAN, Bluetooth, sharer such as HUB, or Internet network. In addition, the interface unit 230 may be realized as at least one module in order to perform communication with a plurality of external apparatuses.

In particular, the interface unit 230 may transmit image data generated by the controller 220 to the external image forming apparatus 100 or a server (not shown).

Figure 4:
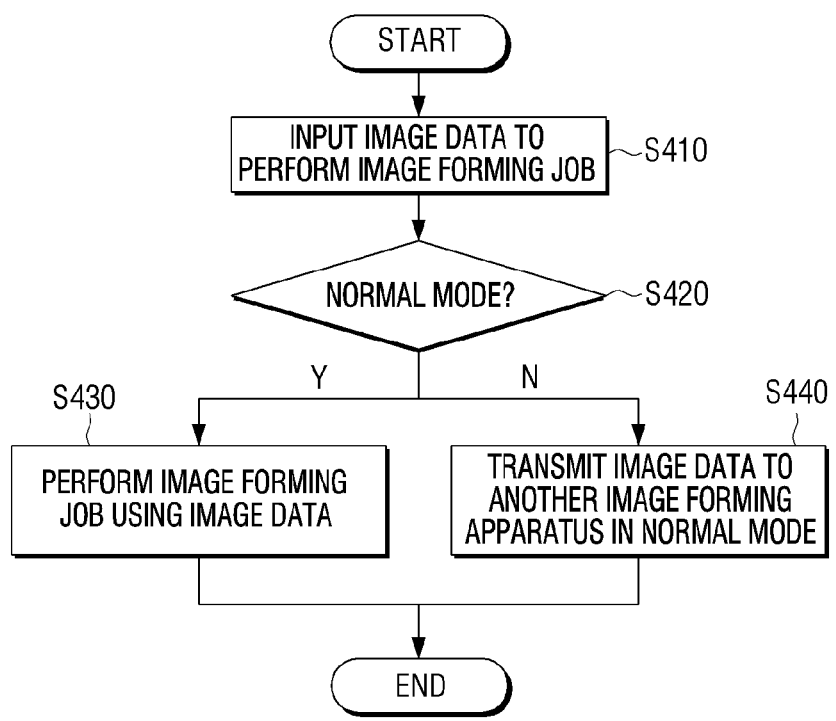
FIG. 4 is a flowchart illustrating a method through which an image forming apparatus performs an image forming job according to an exemplary embodiment of the present general inventive concept.

FIG. 4 is a flowchart provided to explain a method through which the image forming apparatus 100 performs an image forming job according to an exemplary embodiment.

First, the image forming apparatus 100 receives image data to perform an image forming job at operation S410. In this case, the image data to perform an image forming job may be received from the external host apparatus 200, but this is only an example. That is, the image data may be received in other ways. For example, the image data may be inputted directly to the image forming apparatus 100, or may be inputted through a separate server which manages the image forming system 10.

Once the image data is received, the image forming apparatus 100 determines whether the operation mode of the image forming apparatus 100 is a power saving mode or a normal mode at operation S420. In this case, the normal mode of the image forming apparatus 100 refers to a state where at least part of configuration for performing an image forming job is woken-up, and the power saving mode of the image forming apparatus 100 refers to a state where configuration for performing an image forming job is put on standby since an image forming job has not been performed for a predetermined time.

If the operation mode of the image forming apparatus 100 is a normal mode (S420—Y), the image forming apparatus 100 directly performs an image forming job using received image data at operation S430.

However, if the operation mode of the image forming apparatus 100 is a power saving mode (S420—N), the image forming apparatus 100 transmits the image data to another image forming apparatus which is presently in a normal mode at operation S440.

Specifically, if the operation mode of the image forming apparatus 100 is a power saving mode and image data is received, the image forming apparatus 100 searches for another image forming apparatus which is presently in a normal mode from among other image forming apparatuses connected to the image forming apparatus 100. If another image forming apparatus which is presently in a normal mode is found, the image forming apparatus 100 transmits the image data to the image forming apparatus which is presently in a normal mode so that the image forming apparatus which is presently in a normal mode may perform the image forming job.

As described above, if a request for performing an image forming job is received in the image forming apparatus 100 which is in a power saving mode, the request for performing an image forming job is transmitted to another image forming apparatus which is presently in a normal mode. Therefore, the operation mode of the image forming apparatus 100 is not converted from the power saving mode to the normal mode unnecessarily, thereby preventing waste of power consumption.

Figure 5:
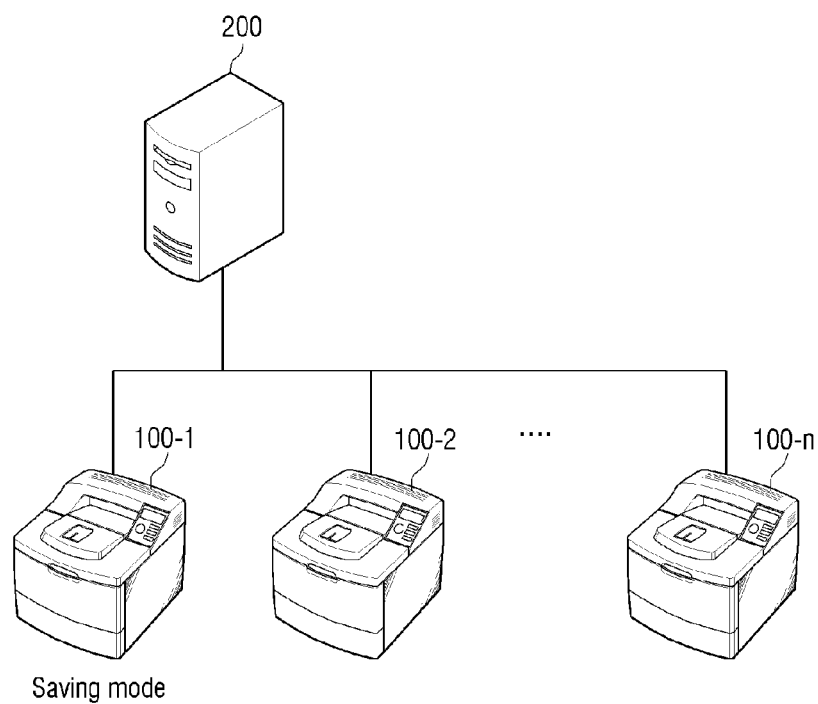
FIG. 5 is a view illustrating an image forming system according to an exemplary embodiment of the present general inventive concept.

With reference to FIGS. 6 to 14, various exemplary embodiments where the image forming apparatus 100 in a power saving mode performs an image forming job will be explained. In particular, as illustrated in FIG. 5, the exemplary embodiments in FIGS. 6 to 14 may assume that there is an image forming system which includes one host apparatus 200 and three image forming apparatuses 100-1, 100-2, 100-3. In addition, if a command to perform an image forming job is received in the host apparatus 200, it may be assumed that the host apparatus 200 transmits image data to the first image forming apparatus 100-1 which is set as default regardless of the operation mode of the first image forming apparatus 100-1. In addition, it may be assumed that the operation mode of the first image forming apparatus 100-1 is a power saving mode.

Figure 6:
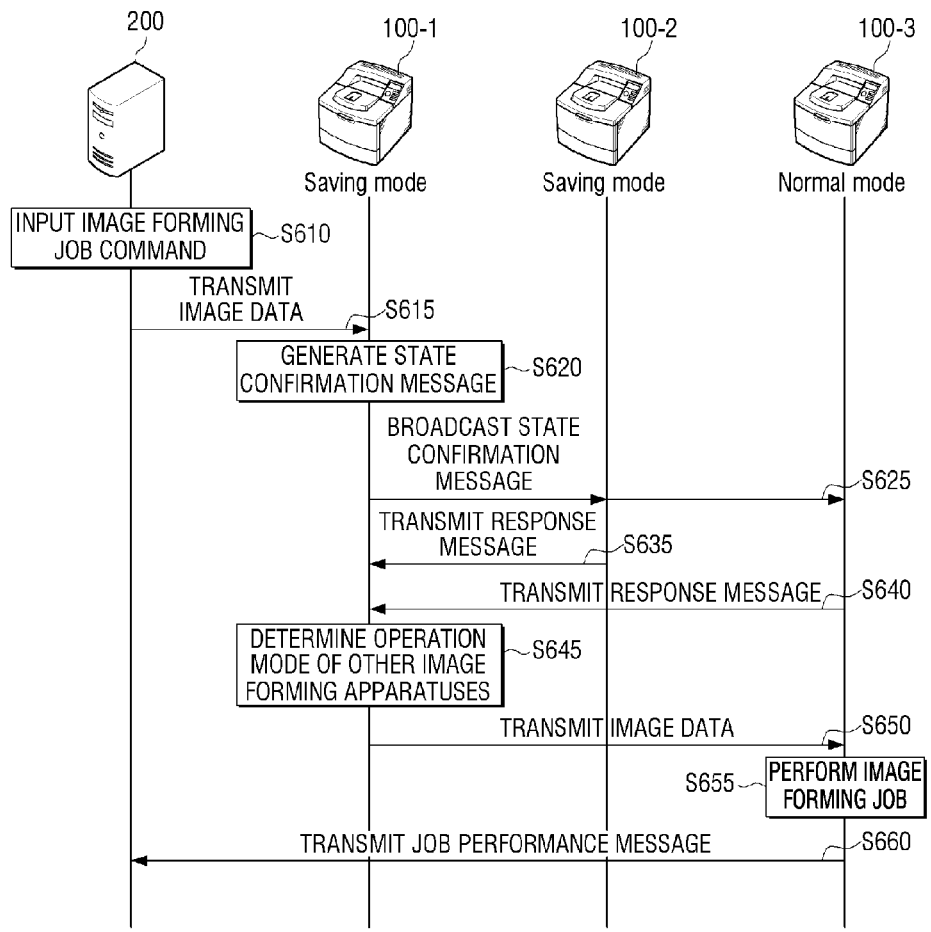
FIGS. 6 to 12 are sequence views illustrating a method of performing an image forming job according to various exemplary embodiments of the present general inventive concept.

FIG. 6 is a sequence view provided to explain a method of performing an image forming job according to a first exemplary embodiment. In particular, FIG. 6 is an exemplary embodiment where image data is transmitted to another image forming apparatus which is presently in a normal mode by determining the modes of other image forming apparatuses 100-2, 100-3.

First, the host apparatus 200 receives a command for an image forming job at operation S610. In this case, the image forming job may be various image forming job commands such as, for example, a printing command or a fax transmission command. If an image forming job command is received, the host apparatus 200 may generate image data according to the image forming job command.

Subsequently, the host apparatus 200 transmits the generated image data to the first image forming apparatus 100-1, which is set as default at operation S615.

After the image data is received, the first image forming apparatus 100-1 confirms that the present operation mode of the first image forming apparatus 100-1 is a power saving mode and generates a state confirmation message to confirm the state of the other image forming apparatuses at operation S620. In this case, the state confirmation message may include a request for information regarding the mode of another image forming apparatus.

The first image forming apparatus 100-1 broadcasts the generated state confirmation message to the second image forming apparatus 100-2 and the third image forming apparatus 100-3 at operations S625 and S630.

Once the state confirmation message is received, the second image forming apparatus 100-2 and the third image forming apparatus 100-3 transmit a response message including their present mode information to the first image forming apparatus 100-1, respectively at operations S635, S640.

The first image forming apparatus 100-1 determines the modes of other image forming apparatuses 100-2, 100-3 using the response message at operation S645. Specifically, the first image forming apparatus 100-1 may determine that the operation mode of the second image forming apparatus 100-2 is a power saving mode and the operation mode of the third image forming apparatus 100-3 is a normal mode by analyzing the response message received from the other image forming apparatuses 100-2, 100-3.

After the modes of other image forming apparatuses 100-2, 100-3 are determined, the first image forming apparatus 100-1 transmits image data to the third image forming apparatus 100-3 which is presently in a normal mode at operation S650.

When the image data is received, the third image forming apparatus 100-3 performs an image forming job using the image data according to a job command included in the image data at operation S655.

Subsequently, the third image forming apparatus 100-3 transmits a job performance message to the host apparatus 200 at operation S660. By receiving the job performance message, the host apparatus 200 may confirm that the third image forming apparatus 100-3 has performed an image forming job and inform a user of the image forming apparatus which has performed the image forming job.

Figure 7:
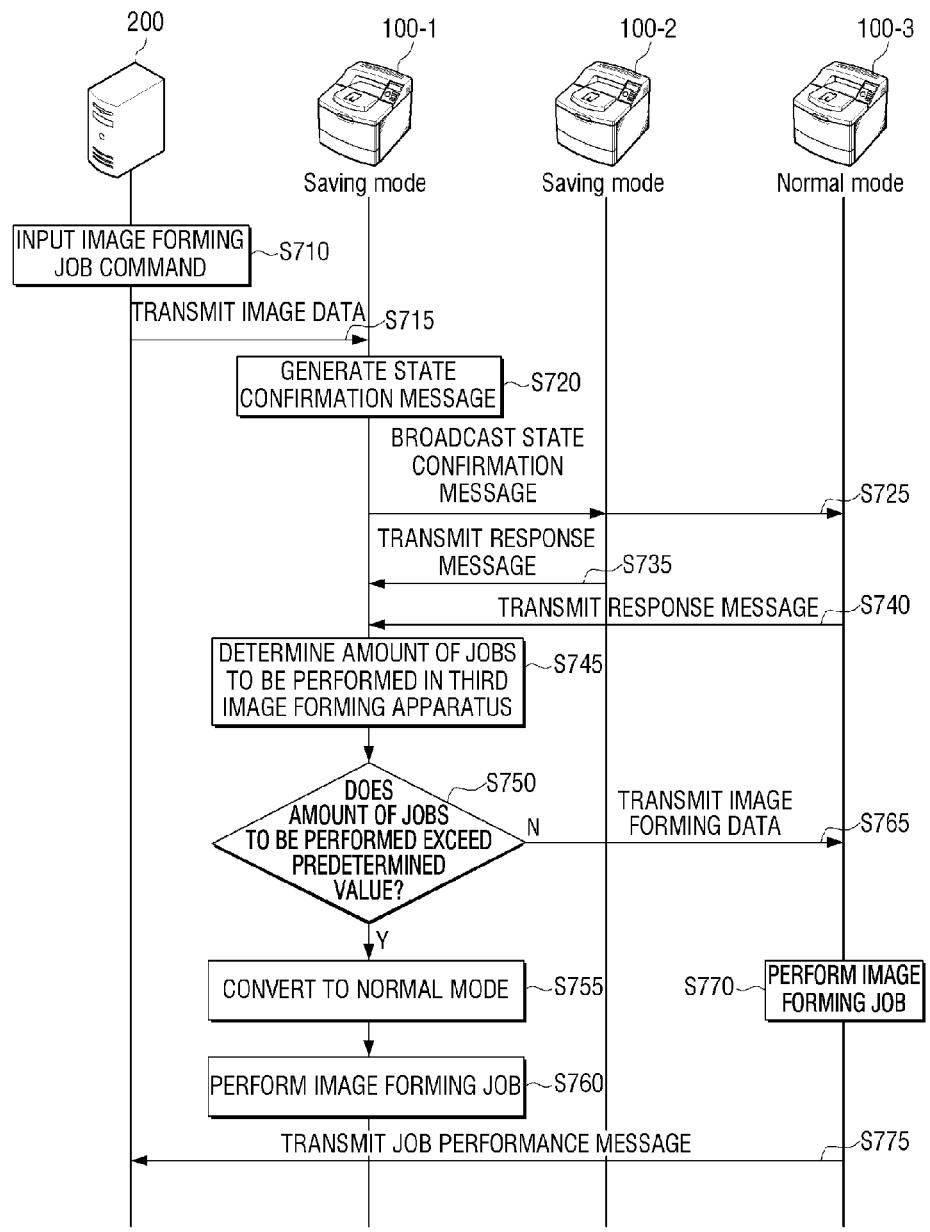

FIG. 7 is a sequence view provided to explain a method of performing an image forming job according to a second exemplary embodiment. In particular, FIG. 7 is an exemplary embodiment for performing an image forming job by determining the amount of jobs waiting to be performed in another image forming apparatus which is presently in a normal mode.

First, the host apparatus 200 receives a command for an image forming job at operation S710. If the image forming job command is received, the host apparatus 200 may generate image data according to the image forming job command.

Subsequently, the host apparatus 200 transmits the generated image data to the first image forming apparatus 100-1, which is set as default at operation S715.

After the image data is received, the first image forming apparatus 100-1 confirms that the present operation mode of the first image forming apparatus 100-1 is a power saving mode and generates a state confirmation message to confirm the state of the other image forming apparatuses at operation S720. In this case, the state confirmation message may include not only a request for information regarding the mode of another image forming apparatus but also a request for information regarding the state of another image forming apparatus (for example, the amount of jobs waiting to be performed).

The first image forming apparatus 100-1 broadcasts the generated state confirmation message to the second image forming apparatus 100-2 and the third image forming apparatus 100-3 at operation S725. In the exemplary embodiment, the state confirmation message is broadcast to confirm the state of a plurality of image forming apparatuses, but the state confirmation message may be transmitted to another image forming apparatus via a multi-casting method or a uni-casting method.

Once the state confirmation message is received, the second image forming apparatus 100-2 and the third image forming apparatus 100-3 transmit a response message including their present mode information and state information to the first image forming apparatus 100-1, respectively at operations S735 and S740.

The first image forming apparatus 100-1 determines the amount of jobs waiting to be performed in the third image forming apparatus 100-3, which is presently in a normal mode, using the response message at operation S745. Specifically, the first image forming apparatus 100-1 determines the operation modes of other image forming apparatuses 100-2, 100-3 by analyzing the response message received from the other image forming apparatuses 100-2, 100-3. The first image forming apparatus 100-1 may determine that the operation mode of the third image forming apparatus 100-3 is a normal mode, and may determine the amount of jobs waiting to be performed in the third image forming apparatus 100-3, which is presently in a normal mode. In this case, the amount of jobs waiting to be performed may be one or more of the number of pages waiting to be printed, the printing standby time, or the number of printing jobs.

If the amount of jobs waiting to be performed in the third image forming apparatus 100-3 exceeds a predetermined value (S750—Y), the first image forming apparatus 100-1 converts its operation mode from a power saving mode to a normal mode at operation S755. For example, if the number of pages waiting to be printed in the third image forming apparatus 100-3 exceeds 100, the first image forming apparatus 100-1 may determine that the amount of jobs waiting to be performed in the third image forming apparatus 100-3 exceeds a predetermined value.

In this case, the first image forming apparatus 100-1 may wake up only part of its configuration according to the type of a job command included in the image data. For example, if a job command of which type is a printing job command is received in the image forming apparatus 100-1, the first image forming apparatus 100-1 may wake up only an image forming unit to perform the printing job. As a result, the wake-up operation may be performed more rapidly since it takes less time to wake up only the function unit involving the image forming job than to wake up all of the function units.

Subsequently, the first image forming apparatus 100-1 performs an image forming job using the received image data at operation S760.

However, if the amount of jobs waiting to be performed in the third image forming apparatus 100-3 is less than a predetermined value (S750—N), the first image forming apparatus 100-1 transmits the image data to the third image forming apparatus 100-3 at operation S765.

Once the image data is received, the third image forming apparatus 100-3 performs the image forming job using the image data according to the job command at operation S770.

The third image forming apparatus 100-3 then transmits a job performance message to the host apparatus 200 at operation S775. After receiving the job performance message, the host apparatus 200 may check that the third image forming apparatus 100-3 has performed the image forming job and inform a user that the image forming job has been performed by the third image forming apparatus.

Figure 8:
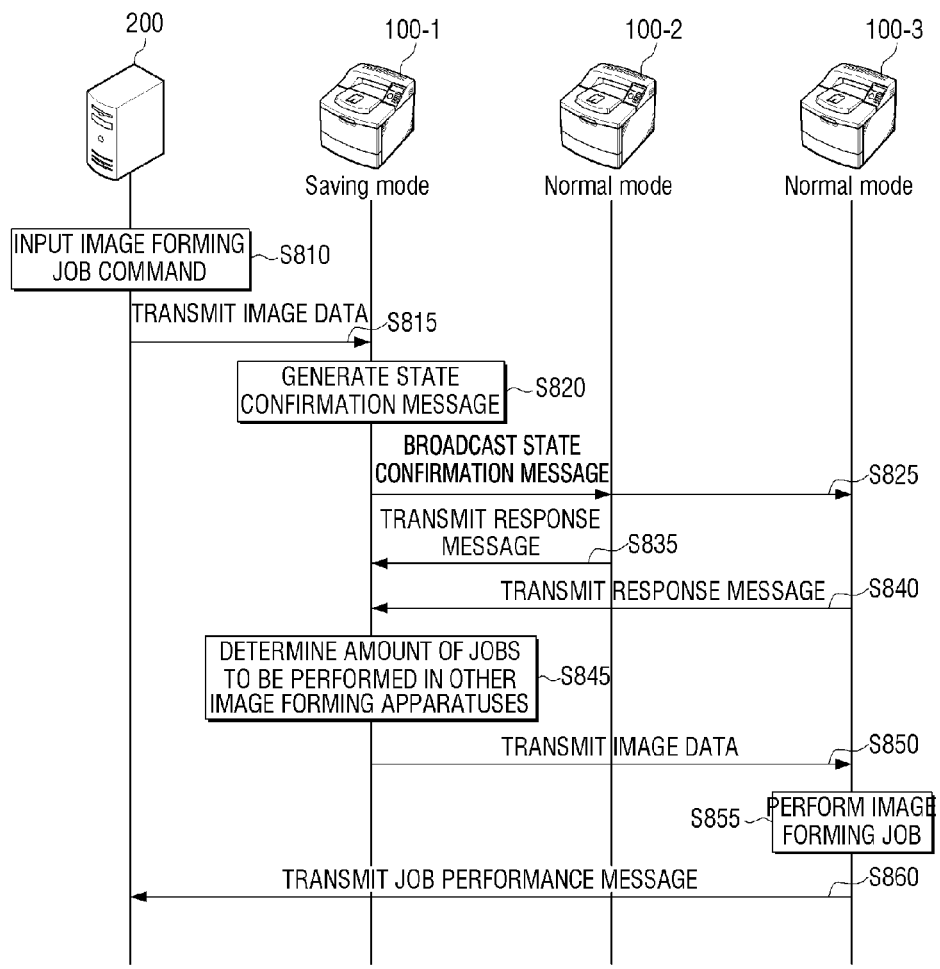

FIG. 8 is a sequence view provided to explain a method of performing an image forming job according to a third exemplary embodiment. In particular, FIG. 8 is an exemplary embodiment for performing an image forming job by determining the amount of jobs waiting to be performed in other image forming apparatuses if there are a plurality of image forming apparatuses which are in a normal mode.

First, the host apparatus 200 receives a command for an image forming job (S810). After the image forming job command is received, the host apparatus 200 may generate image data according to the image forming job command.

Subsequently, the host apparatus 200 transmits the generated image data to the first image forming apparatus 100-1, which is set as default at operation S815.

After the image data is received, the first image forming apparatus 100-1 confirms that the present operation mode of the first image forming apparatus 100-1 is a power saving mode and generates a state confirmation message to confirm the state of other image forming apparatuses at operation S820. In this case, the state confirmation message may include not only a request for information regarding the mode of another image forming apparatus but also a request for information regarding the state of another image forming apparatus (for example, the amount of jobs waiting to be performed).

The first image forming apparatus 100-1 broadcasts the generated state confirmation message to the second image forming apparatus 100-2 and the third image forming apparatus 100-3 at operation S825.

Once the state confirmation message is received, the second image forming apparatus 100-2 and the third image forming apparatus 100-3 transmit a response message including their present mode information and state information to the first image forming apparatus 100-1, respectively at operations S835 and S840.

The first image forming apparatus 100-1 determines the amount of jobs waiting to be performed in other image forming apparatuses 100-2, 100-3, which are both in a normal mode, using the response message at operation S845. Specifically, the first image forming apparatus 100-1 determines the operation modes of other image forming apparatuses 100-2, 100-3 by analyzing the response message received from the other image forming apparatuses 100-2, 100-3. The first image forming apparatus 100-1 may determine that the present operation modes of the second image forming apparatus 100-2 and the third image forming apparatus 100-3 are both normal modes, and may determine the amount of jobs waiting to be performed in the second image forming apparatus 100-2 and the third image forming apparatus 100-3, respectively.

The first image forming apparatus 100-1 may determine which image forming apparatus has the least amount of jobs waiting to be performed between the second image forming apparatus 100-2 and the third image forming apparatus 100-3 in order to determine which image forming apparatus should perform the image forming job. For example, if the number of pages waiting to be printed in the second image forming apparatus 100-2 is 20, and the number of pages waiting to be printed in the third image forming apparatus 100-3 is 10, the first image forming apparatus 100-1 may determine that the third image forming apparatus 100-3 has the least amount of jobs waiting to be performed.

After determining the amount of jobs waiting to be performed in other image forming apparatuses 100-2, 100-3, the first image forming apparatus 100-1 transmits image data to the third image forming apparatus 100-3, which has the least amount of jobs waiting to be performed at operation S850.

After the image data is received, the third image forming apparatus 100-3 performs the image forming job using the image data at operation S855.

Subsequently, the third image forming apparatus 100-3 transmits a job performance message to the host apparatus 200 at operation S860. After receiving the job performance message, the host apparatus 200 may check that the third image forming apparatus 100-3 has performed the image forming job and inform a user that the image forming job has been performed by the third image forming apparatus.

Alternatively, if a plurality of image forming apparatuses 100-2, 100-3 which are in a normal mode are searched and the amount of jobs waiting to performed in both of the image forming apparatuses 100-2, 100-3 exceeds a predetermined value, the first image forming apparatus 100-1 converts its operation mode to a normal mode and performs the image forming job.

Figure 9:
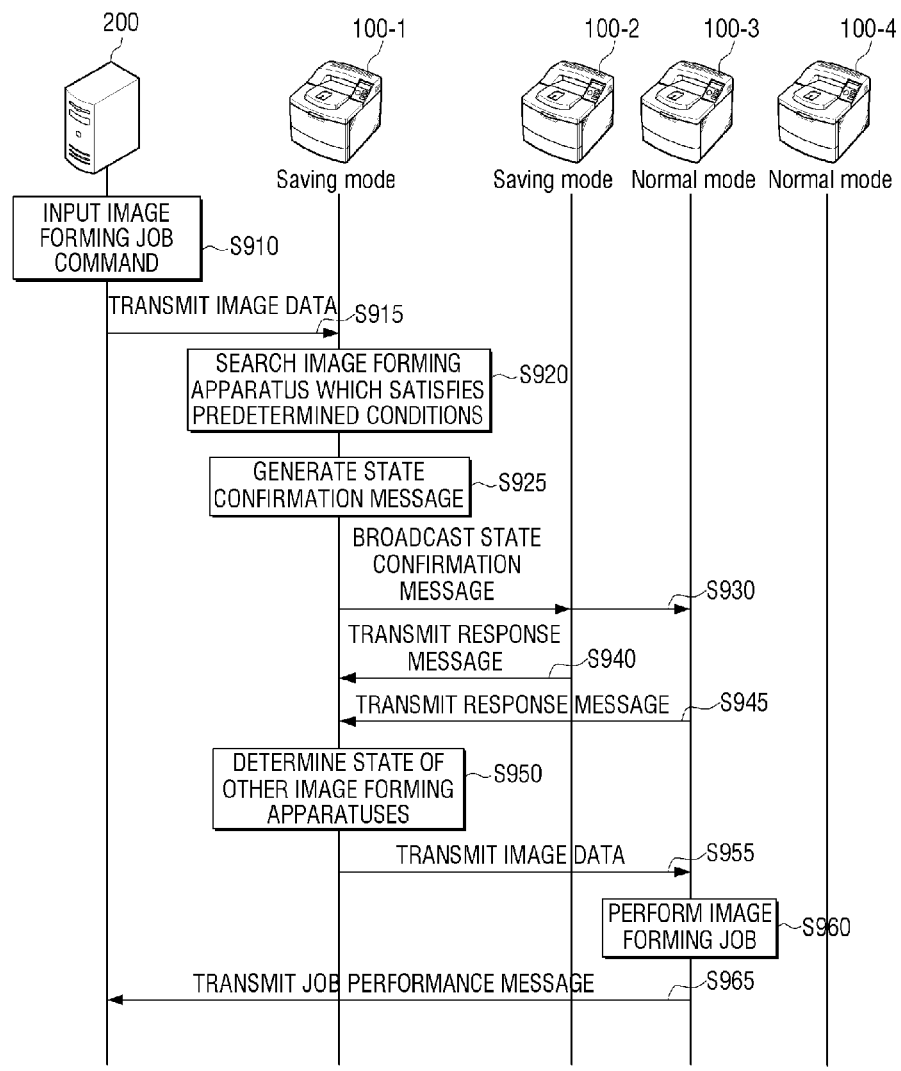

FIG. 9 is a sequence view provided to explain a method of performing an image forming job according to a fourth exemplary embodiment. In particular, FIG. 9 is an exemplary embodiment for searching for an image forming apparatus which satisfies predetermined conditions based on information stored in the storage unit 130 so that an image forming apparatus which is presently in a normal mode from among the searched image forming apparatuses may perform an image forming job. Note that a fourth image forming apparatus 100-4 is added to the image forming system of FIG. 9.

First, the host apparatus 200 receives a command for an image forming job at operation S910. In this case, the image forming job may be various image forming job commands, such as a printing command and a fax printing command. Once the image forming job command is received, the host apparatus 200 may generate image data according to the image forming job command.

Subsequently, the host apparatus 200 transmits the generated image data to the first image forming apparatus 100-1, which is set as default at operation S915.

Once the image data is received, the first image forming apparatus 100-1 searches for an image forming apparatus which satisfies predetermined conditions at operation S920. In this case, the first image forming apparatus 100-1 may search for another image forming apparatus which satisfies predetermined conditions based on information pre-stored in the storage unit 130. Herein, the predetermined conditions may include at least one of user authentication state, user setting information, apparatus location, or job performance capability. For example, if information regarding an image forming apparatus which can be used by user A is stored in the storage unit 130 and an image forming job command is received from the authenticated user A, the first image forming apparatus 100-1 may search for an image forming apparatus which is designated as permissible to be used by user A. In another exemplary embodiment, if an image forming apparatus which is set by a user to perform an image forming job is stored in the storage unit 130, the first image forming apparatus 100-1 may search the image forming apparatus set by the user. Alternatively, if location information regarding another image forming apparatus is stored in the storage unit 130, the storage unit 130 may search for an image forming apparatus within a predetermined distance from the host apparatus 200 to which the image forming job command is received. Further, if information regarding job performance capability of another image forming apparatus is stored in the storage unit 130 and a specific image forming job command (for example, a color printing job) is received, the first image forming apparatus 100-1 may search for another image forming apparatus which is capable of performing the specific image forming job.

Subsequently, the first image forming apparatus 100-1 generates a state confirmation message to confirm the state of external image forming apparatuses at operation S925. In this case, the state confirmation message may include a request for information regarding the mode of another image forming apparatus.

The first image forming apparatus 100-1 broadcasts the generated state confirmation message to the second image forming apparatus 100-2 and the third image forming apparatus 100-3 at operation S930. In this case, the first image forming apparatus 100-1 transmits the state confirmation message to the image forming apparatuses 100-2, 100-3 which are searched in step S925 and does not transmit the state confirmation message to the image forming apparatus 100-4 which is not searched in step S925.

If the state confirmation message is received, the second image forming apparatus 100-2 and the third image forming apparatus 100-3 transmit a response message including their present mode information to the first image forming apparatus 100-1, respectively at operations S940 and S945.

The first image forming apparatus 100-1 determines the present mode of the other image forming apparatuses 100-2, 100-3 using the response message at operation S950. Specifically, the first image forming apparatus 100-1 analyzes the response message received from the image forming apparatuses 100-2, 100-3 to determine that in this case the present operation mode of the second image forming apparatus 100-2 is a power saving mode and the present operation mode of the third image forming apparatus 100-3 is a normal mode.

After the modes of the image forming apparatuses 100-2, 100-3 are determined, the first image forming apparatus 100-1 transmits image data to the third image forming apparatus 100-3 at operation S955.

Once the image data is received, the third image forming apparatus 100-3 performs an image forming job using the image data at operation S960.

Subsequently, the third image forming apparatus 100-3 transmits a job performance message to the host apparatus 200 at operation S965. By receiving the job performance message, the host apparatus 200 may check that the third image forming apparatus 100-3 has performed the image forming job and inform a user that the image forming job has been performed by the third image forming apparatus.

Figure 10:
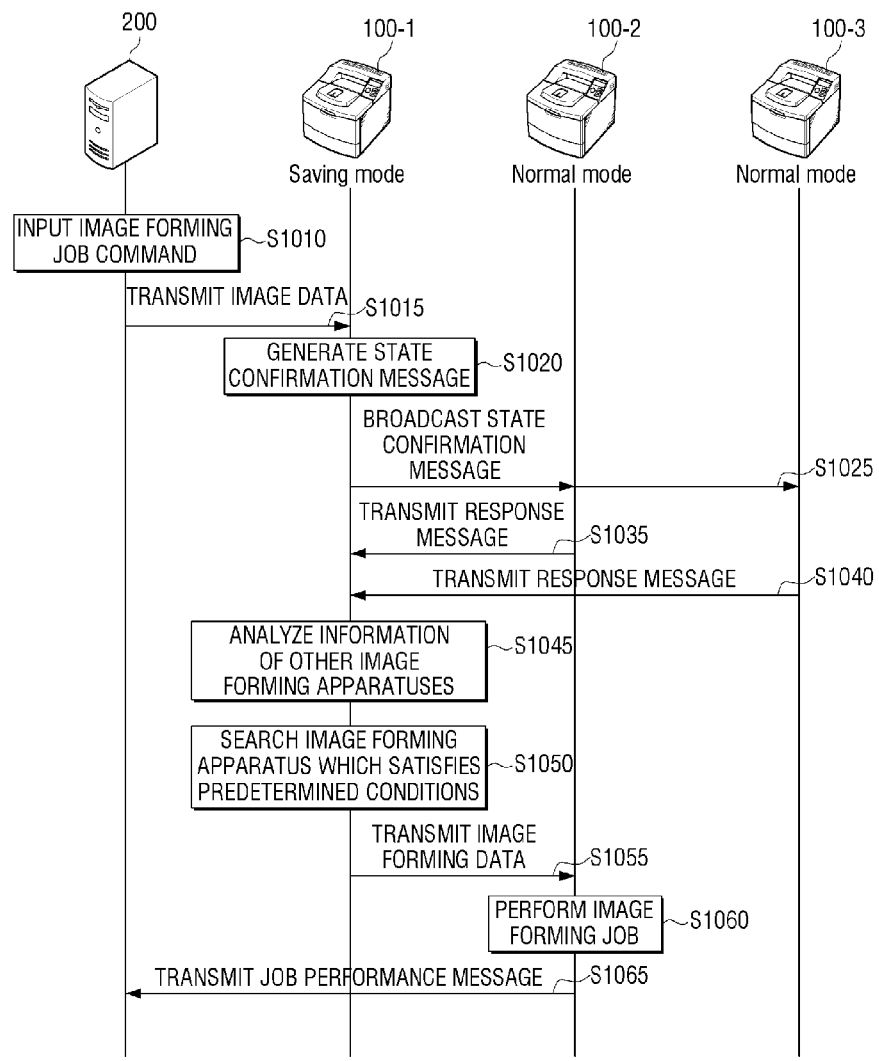

FIG. 10 is a sequence view provided to explain a method of performing an image forming job according to a fifth exemplary embodiment. In particular, FIG. 10 is an exemplary embodiment for searching for an image forming apparatus which satisfies predetermined conditions by determining the states of the image forming apparatuses 100-2, 100-3 and performing an image forming job using the image forming apparatus which is presently in a normal mode from among the searched image forming apparatuses.

First, the host apparatus 200 receives a command for an image forming job at operation S1010. In this case, the image forming job command may be any of various image forming job commands such as, for example a printing command or a fax printing command. If an image forming job command is received, the host apparatus 200 may generate image data according to the image forming job command.

Subsequently, the host apparatus 200 transmits the generated image data to the first image forming apparatus 100-1, which is set as default at operation S1015.

After the image data is received, the first image forming apparatus 100-1 confirms that its operation mode is a power saving mode and generates a state confirmation message to check the states of the other image forming apparatuses at operation S1020. In this case, the state confirmation message may include a request for information regarding the modes of other image forming apparatuses and a request for information regarding the states of other image forming apparatuses.

The first image forming apparatus 100-1 broadcasts the generated state confirmation message to the second image forming apparatus 100-2 and the third image forming apparatus 100-3 at operation S1025.

Once the state confirmation message is received, the second image forming apparatus 100-2 and the third image forming apparatus 100-3 transmit a response message including the mode information and the state information of the second image forming apparatus 100-2 and the third image forming apparatus 100-3 to the first image forming apparatus 100-1, respectively at operations S1035 and S1040.

The first image forming apparatus 100-1 analyzes information of the other image forming apparatuses 100-2, 100-3 using the response message at operation S1045. In this case, the information regarding the other image forming apparatuses 100-2, 100-3 includes at least one of warming-up state information, information on use of consumables, the amount of jobs waiting to be performed, or an expected job processing time.

Subsequently, the first image forming apparatus 100-1 searches for an image forming apparatus which satisfies predetermined conditions using the information regarding other image forming apparatuses 100-2, 100-3 at operation S1050. In this case, the predetermined conditions may be at least one of a warming-up state, information on use of consumables, the amount of jobs waiting to be performed, or an expected job processing time.

For example, the first image forming apparatus 100-1 may search for another image forming apparatus in which the configuration corresponding to the type of the received job command is warmed-up from among other image forming apparatuses which are in a normal mode. In another exemplary embodiment, the first image forming apparatus 100-1 may search for another image forming apparatus in which the remaining amount of consumables is more than a predetermined value from among other image forming apparatuses which are in a normal mode. Alternatively, the first image forming apparatus 100-1 may search for another image forming apparatus in which one of the amount of jobs waiting to be performed and an expected job processing time is less than a predetermined value.

Subsequently, the first image forming apparatus 100-1 transmits the image data to the selected image forming apparatus at operation S1055. For example, if the type of the received job command is a scanning job, the first image forming apparatus 100-1 may transmit the image data to the second image forming apparatus in which a scanning unit is warmed-up from among other image forming apparatuses which are in a normal mode.

After the image data is received, the second image forming apparatus 100-2 performs the image forming job using the image data at operation S1060.

Subsequently, the second image forming apparatus 100-2 transmits a job performance message to the host apparatus 200 at operation S1065. By receiving the job performance message, the host apparatus 200 may check that the second image forming apparatus 100-2 has performed the image forming job and inform a user that the image forming job has been performed by the second image forming apparatus 100-2.

Likewise, if a plurality of image forming apparatuses are searched, the first image forming apparatus 100-1 may transmit the image data to the image forming apparatus having the minimum amount of jobs waiting to be performed from among the plurality of image forming apparatuses.

If there is no image forming apparatus which satisfies search conditions even though there are image forming apparatuses which are in a normal mode, the first image forming apparatus 100-1 may convert the operation mode from a power saving mode to a normal mode and perform the image forming job using the image data.

Figure 11:
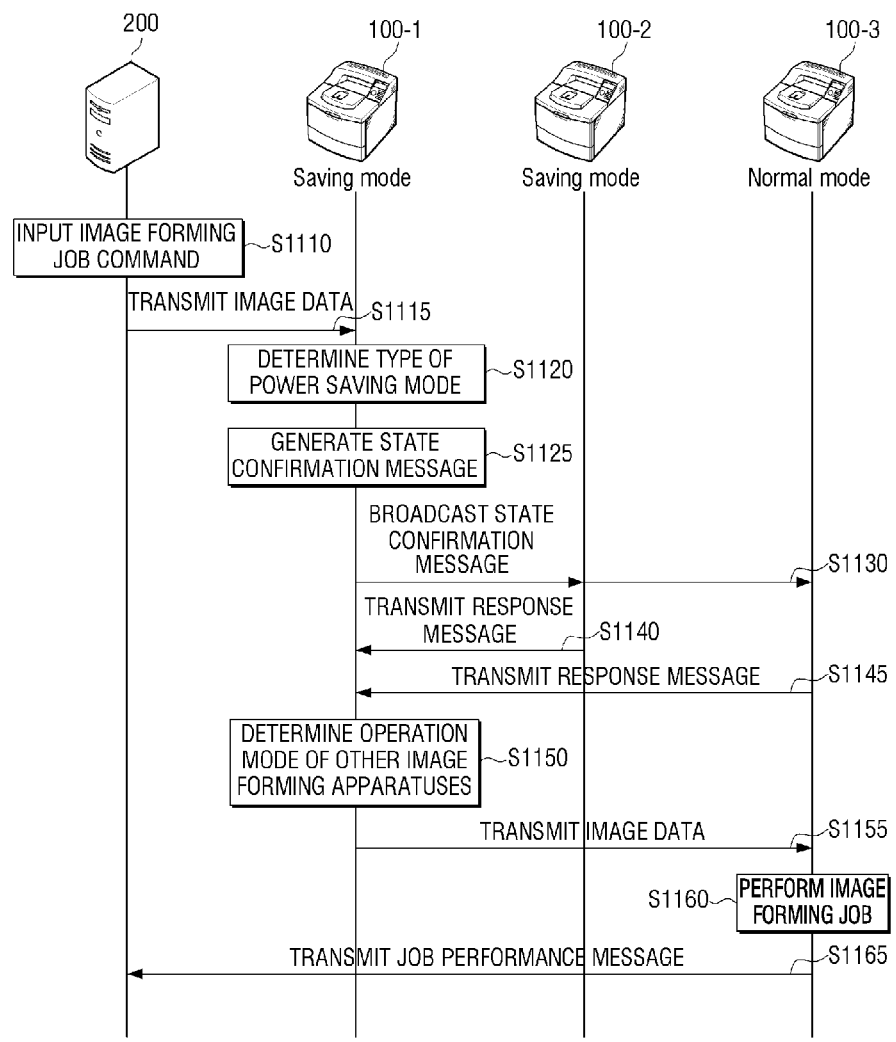

FIG. 11 is a sequence view provided to explain a method of performing an image forming job according to a sixth exemplary embodiment. In particular, FIG. 11 is an exemplary embodiment for performing an image forming job differently depending on the type of a power saving mode if the power saving mode consists of a plurality of modes.

First, the host apparatus 200 receives a command for an image forming job at operation S1110. If an image forming job command is received, the host apparatus 200 may generate image data according to the image forming job command.

Subsequently, the host apparatus 200 transmits the generated image data to the first image forming apparatus 100-1, which is set as default at operation S1115.

After the image data is received, the first image forming apparatus 100-1 determines the type of the power saving mode of the first image forming apparatus 100-1 at operation S1120. The power saving mode according to an exemplary embodiment may consist of four steps as described above with reference to FIG. 2. In this case, the first to the fourth power saving modes may be determined according to a standby time until a signal to perform the image forming job is received, and each mode may have different configurations for applying power and different standby power consumption.

In particular, the power saving mode of the first image forming apparatus 100-1 is a predetermined power saving mode from among a plurality of power saving modes. The first image forming apparatus 100-1 generates a state confirmation message to confirm the state of other external image forming apparatuses at operation S1125. For example, if the present power saving mode of the first image forming apparatus is the third power saving mode or the fourth power saving mode from among four power saving modes, the first image forming apparatus 100-1 may generate a state confirmation message. If the present operation mode of the first image forming apparatus 100-1 is the third power saving mode or the fourth power saving mode, it is desirable to perform an image forming job using other image forming apparatuses 100-2, 100-3, since it takes considerable amount of power to convert the operation mode to a normal mode.

Subsequently, the first image forming apparatus 100-1 broadcasts the generated state confirmation message to the second image forming apparatus 100-2 and the third image forming apparatus 100-3 at operation S1130.

Once the state confirmation message is received, the second image forming apparatus 100-2 and the third image forming apparatus 100-3 each transmits a response message including their mode information to the first image forming apparatus 100-1, respectively at operations S1140 and S1145.

The first image forming apparatus 100-1 determines the modes of other image forming apparatuses 100-2, 100-3 using the response message at operation S1150. Specifically, the first image forming apparatus 100-1 analyzes the response message received from other image forming apparatuses 100-2, 100-3 to determine that, in this case, the operation mode of the second image forming apparatus 100-2 is a power saving mode and the operation mode of the third image forming apparatus 100-3 is a normal mode.

After the modes of other image forming apparatuses 100-2, 100-3 are determined, the first image forming apparatus 100-1 transmits image data to the third image forming apparatus 100-3, which is presently in a normal mode at operation S1155.

Once the image data is received, the third image forming apparatus 100-3 performs an image forming job using the image data at operation S1160.

Subsequently, the third image forming apparatus 100-3 transmits a job performance message to the host apparatus 200 at operation S1165. By receiving the job performance message, the host apparatus 200 may confirm that the third image forming apparatus 100-3 has performed the image forming job and inform a user that the image forming job has been performed by the third image forming apparatus.

If the operation mode of the first image forming apparatus 100-1 is the first power saving mode or the second power saving mode, however, and image data is received from the host apparatus 200, the first image forming apparatus 100-1 may convert the operation mode from the power saving mode to a normal mode and perform an image forming job using the image data.

Figure 12:
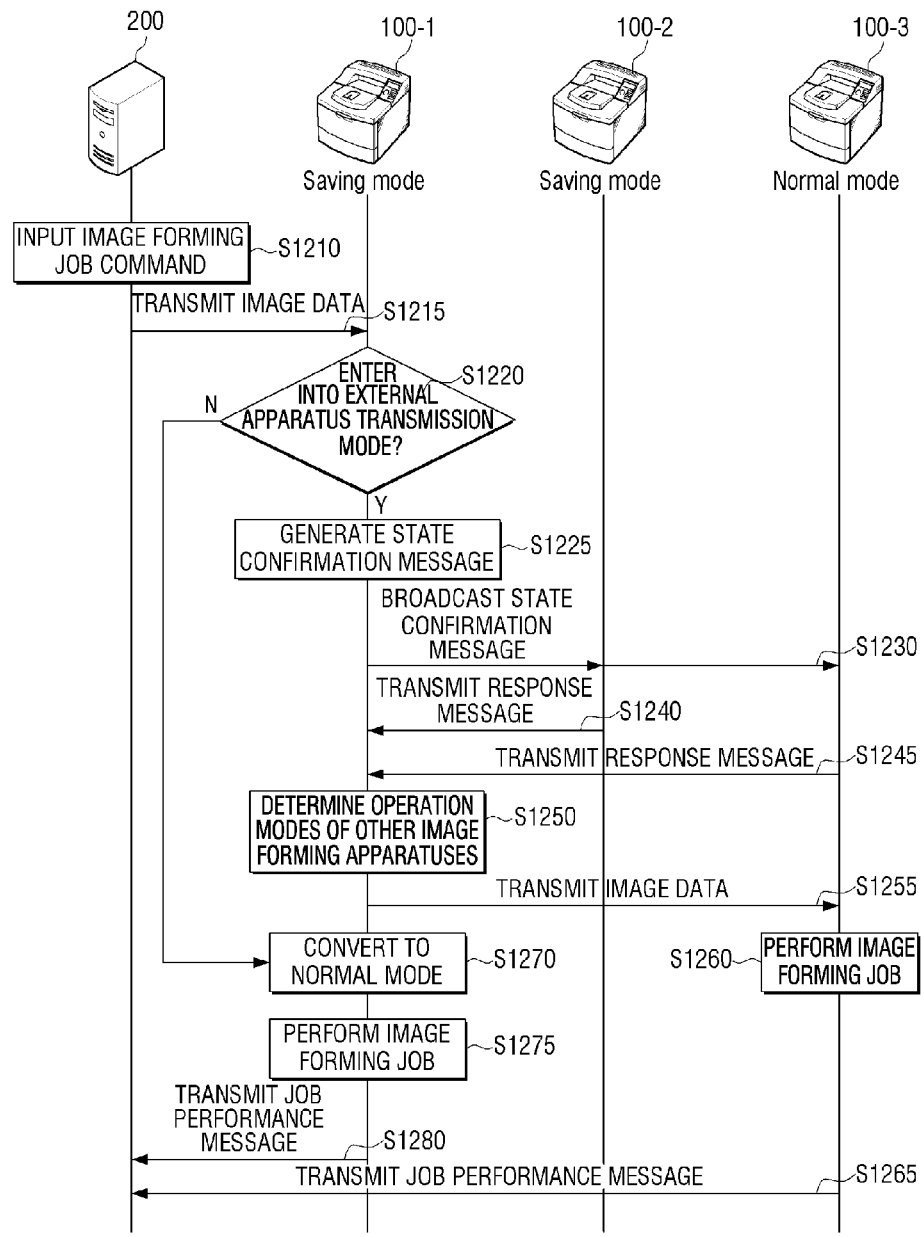

FIG. 12 is a sequence view provided to explain a method of performing an image forming job according to a seventh exemplary embodiment. In particular, FIG. 12 is an exemplary embodiment for performing an image forming job differently depending on whether the first image forming apparatus 100-1 enters into a predetermined mode (for example, an external apparatus transmission mode).

First, the host apparatus 200 receives a command for an image forming job at operation S1210. After the image forming job command is received, the host apparatus 200 may generate image data according to the image forming job command.

Subsequently, the host apparatus 200 transmits the generated image data to the first image forming apparatus 100-1, which is set as default at operation S1215.

After the image data is received, the first image forming apparatus 100-1 determines whether it should enter into an external apparatus transmission mode. In this case, external apparatus transmission mode refers to the type of a power saving mode in which image data is transmitted to another image forming apparatus which is presently in a normal mode from among external image forming apparatuses when image data is received by the first image forming apparatus 100-1 from the host apparatus 200.

Figure 13:
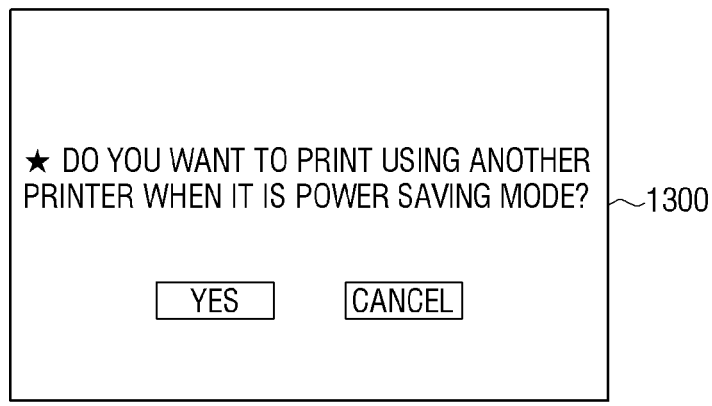
FIG. 13 is a view illustrating a User Interface (UI) to enter into an external apparatus transmission mode according to an exemplary embodiment of the present general inventive concept.

The first image forming apparatus 100-1 may enter into the external apparatus transmission mode in various ways. For example, the external apparatus transmission mode may be entered into through a UI. As illustrated in FIG. 13, the first image forming apparatus 100-1 may cause the host apparatus 200 to display a UI 1300 including the sentence, "Do you want to perform a printing job using another printer in a power saving mode?", and if a user selects "Yes", the first image forming apparatus 100-1 may enter into the external apparatus transmission mode. In another exemplary embodiment, the first image forming apparatus 100-1 may enter into the external apparatus transmission mode only at a specific period (for example, at dawn). Alternatively, the first image forming apparatus 100-1 may enter into the external apparatus transmission mode only when a specific type of job command (for example, a black-and-white printing command) is received.

When entering into the external apparatus transmission mode (S1220—Y), the first image forming apparatus 100-1 generates a state confirmation message to confirm the states of other external image forming apparatuses at operation S1225.

The first image forming apparatus 100-1 broadcasts the generated state confirmation message to the second image forming apparatus 100-2 and the third image forming apparatus 100-3 at operation S1230.

After the state confirmation message is received, the second image forming apparatus 100-2 and the third image forming apparatus 100-3 transmit a response message including their present mode information to the first image forming apparatus 100-1, respectively at operations S1240 and S1245.

The first image forming apparatus 100-1 determines the modes of the other image forming apparatuses 100-2, 100-3 using the response message at operation S1250. Specifically, the first image forming apparatus 100-1 may determine that the operation mode of the second image forming apparatus 100-2 is a power saving mode and the operation mode of the third image forming apparatus 100-3 is a normal mode by analyzing the response message received from the other image forming apparatuses 100-2, 100-3.

Once the modes of other image forming apparatuses 100-2, 100-3 are determined, in this case the first image forming apparatus 100-1 transmits image data to the third image forming apparatus 100-3, which is presently in a normal mode at operation S1255.

When the image data is received, the third image forming apparatus 100-3 performs an image forming job using the image data at operation S1260.

Subsequently, the third image forming apparatus 100-3 transmits a job performance message to the host apparatus 200 at operation S1265. By receiving the job performance message, the host apparatus 200 may confirm that the third image forming apparatus 100-3 has performed the image forming job and inform a user that the image forming job has been performed by the third image forming apparatus.

However, even if the first image forming apparatus 100-1 is in a power saving mode, the first image forming apparatus 100-1 converts the operation mode form the power saving mode to a normal mode at operation S1270 if it is not entered into the external apparatus transmission mode (S1220—N).

Subsequently, the first image forming apparatus 100-1 performs an image forming job using the received image data at operation S1275.

In this case, the first image forming apparatus 100-1 transmits a job performance message to the host apparatus 200 at operation S1280. By receiving the job performance message, the host apparatus 200 may inform a user that the image forming job has been performed by the first image forming apparatus 100-1.

Figure 14:
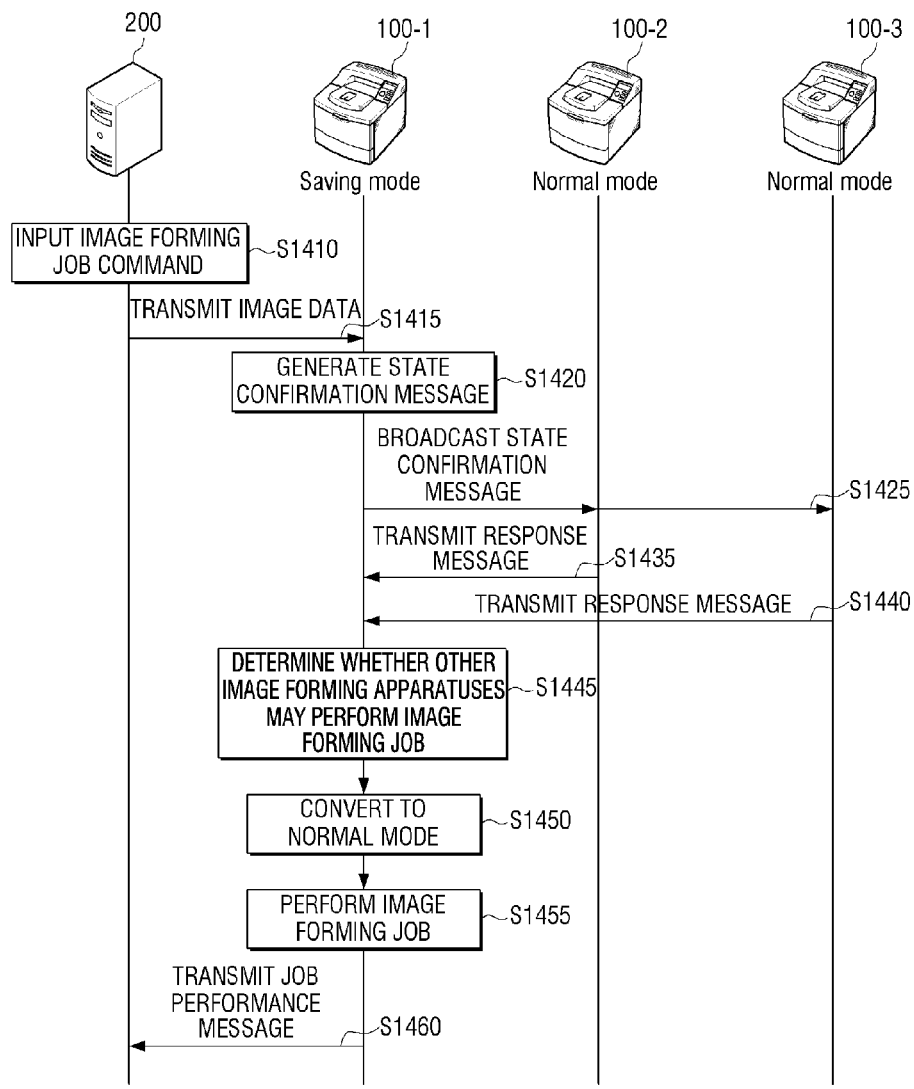
FIG. 14 is a sequence view provided to explain a method of performing an image forming job according to an exemplary embodiment of the present general inventive concept.

FIG. 14 is a sequence view provided to explain a method of performing an image forming job according to an eighth exemplary embodiment. In particular, FIG. 14 is an exemplary embodiment for performing an image forming job by determining whether it is possible to perform the received image forming job in another image forming apparatus.

First, the host apparatus 200 receives a command for an image forming job at operation S1410. In this case, the image forming job command may be any of various image forming job commands such as, for example, a printing command or a fax printing command. After an image forming job command is received, the host apparatus 200 may generate image data according to the image forming job command.

Subsequently, the host apparatus 200 transmits the generated image data to the first image forming apparatus 100-1, which is set as default at operation S1415.

Once the image data is received, the first image forming apparatus 100-1 confirms that its operation mode is a power saving mode and generates a state confirmation message to check the states of the other image forming apparatuses at operation S1420. In this case, the state confirmation message may include a request for information regarding the modes of other image forming apparatuses.

The first image forming apparatus 100-1 broadcasts the generated state confirmation message to the second image forming apparatus 100-2 and the third image forming apparatus 100-3 at operation S1425.

After the state confirmation message is received, the second image forming apparatus 100-2 and the third image forming apparatus 100-3 transmit a response message including the mode information of the second image forming apparatus 100-2 and the third image forming apparatus 100-3 to the first image forming apparatus 100-1, respectively, at operations S1435 and S1440.

The first image forming apparatus 100-1 determines whether it is possible to perform an image forming job in other image forming apparatuses 100-2, 100-3 using the response message at operation S1445. For example, if an image forming job is a color printing job, the first image forming apparatus 100-1 may determine whether it is possible to perform the color printing job in the image forming apparatuses 100-2 and 100-3 using the response message. In another exemplary embodiment, if an image forming job is a black-and-white printing job of 100 pages, the first image forming apparatus 100-1 may determine whether it is possible to perform the black-and-white printing job of 100 pages in the image forming apparatuses 100-2, 100-3 using the response message.

According to the determination result, the first image forming apparatus 100-1 may convert its operation mode from the power saving mode to a normal mode at operation S1450. Specifically, if there is no image forming apparatus capable of performing a received image forming job, the first image forming apparatus 100-1 may convert the operation mode from the power saving mode to a normal mode.

Subsequently, the first image forming apparatus 100-1 performs an image forming job using the image data at operation S1455.

Subsequently, the first image forming apparatus 100-1 transmits a job performance message to the host apparatus 200 at operation S1460. After receiving the job performance message, the host apparatus 200 may inform a user that the image forming job has been performed by the first image forming apparatus 100-1.

If there is another image forming apparatus capable of performing the image forming job, however, the first image forming apparatus 100-1 may transmit the image data to the image forming apparatus which is capable of performing the image forming job. Alternatively, if there are multiple image forming apparatuses capable of performing the image forming job, the first image forming apparatus 100-1 may transmit the image data to the image forming apparatus having the minimum amount of jobs waiting to be performed from among other image forming apparatuses which are capable of performing the image forming job.

In the exemplary embodiments illustrated in FIGS. 6 to 14, the first image forming apparatus 100-1 broadcasts the state confirmation message to obtain information regarding the modes and states of other image forming apparatuses 100-2, 100-3, but this broadcast-and-response method is only an example. The information regarding the modes and states of other image forming apparatuses 100-2, 100-3 may be obtained in other ways. For example, the first image forming apparatus 100-1 may obtain the information regarding the modes and states from the image forming apparatuses 100-2, 100-3 on a regular or non-regular basis, and may obtain the information regarding the modes and states of the image forming apparatuses 100-2, 100-3 from the host apparatus 200 which inputs the image data.

Hereinafter, an exemplary embodiment where the host apparatus 200 handles an image forming job according to the operation mode of an image forming apparatus will be explained with reference to FIGS. 15 to 18.

Figure 15:
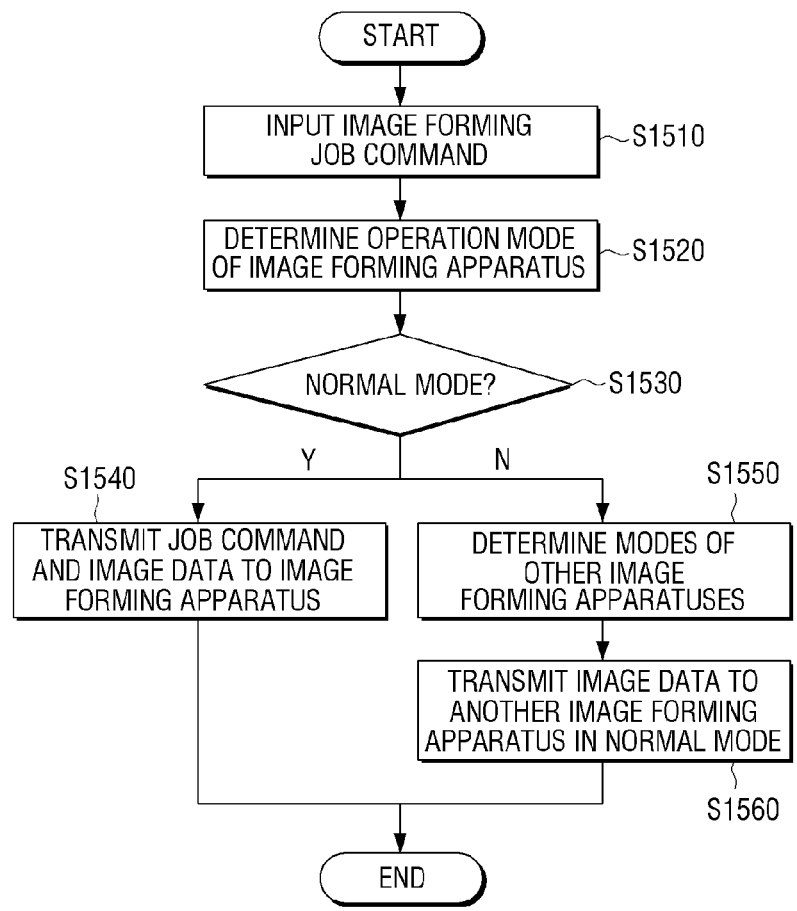
FIG. 15 is a flowchart provided to explain a method through which a host apparatus performs an image forming job according to an exemplary embodiment of the present general inventive concept.

FIG. 15 is a flowchart provided to explain a method through which the host apparatus 200 performs an image forming job based on the operation mode of an image forming apparatus according to an exemplary embodiment.

First, the host apparatus 200 receives a command for an image forming job at operation S1510. In this case, the image forming job may be one of various operations such as, for example, black-and-white printing, color printing, scanning, and faxing. The host apparatus 200 may generate image data corresponding to the image forming job which can be in an image forming apparatus.

Subsequently, the host apparatus 200 determines the present operation mode of the image forming apparatus 100 at operation S1520. That is, the host apparatus 200 determines whether the present operation mode of the image forming apparatus 100 is a normal mode or a power saving mode at operation S1530. In this case, if an image forming job command is input to the host apparatus 200, the image forming apparatus 100 may be an image forming apparatus which is set as default for the host apparatus 200 to preferentially transmit the image data.

If the operation mode of the image forming apparatus 100 is a normal mode (S1530—Y), the host apparatus 200 transmits the image data to the image forming apparatus 100 at operation S1540. Subsequently, the image forming apparatus may perform an image forming job using the image data.

However, if the present operation mode of the image forming apparatus 100 is a power saving mode (S1530—N), the host apparatus 200 determines the present operation modes of other image forming apparatuses at operation S1550. In this case, the host apparatus 200 may determine the operation modes of other image forming apparatuses by broadcasting a state confirmation message to other image forming apparatuses, but this is only an example. The host apparatus 200 may determine the present operation modes of other image forming apparatuses in various ways. For example, the host apparatus 200 may determine the operation modes of other image forming apparatuses by receiving a state message from other image forming apparatuses on a regular or non-regular basis.

Subsequently, the host apparatus 200 transmits the image data to another image forming apparatus which is presently in a normal mode from among other image forming apparatuses at operation S1560. The image forming apparatus which is presently in a normal mode may perform an image forming job using the image data.

As described above, if the present operation mode of an image forming apparatus which is set as default with respect to the host apparatus 200 is a power saving mode, an image forming job command is transmitted to another image forming apparatus which is presently in a normal mode in order to prevent the image forming apparatus which is in a power saving mode form being converted to the operation mode unnecessarily.

Figure 16:
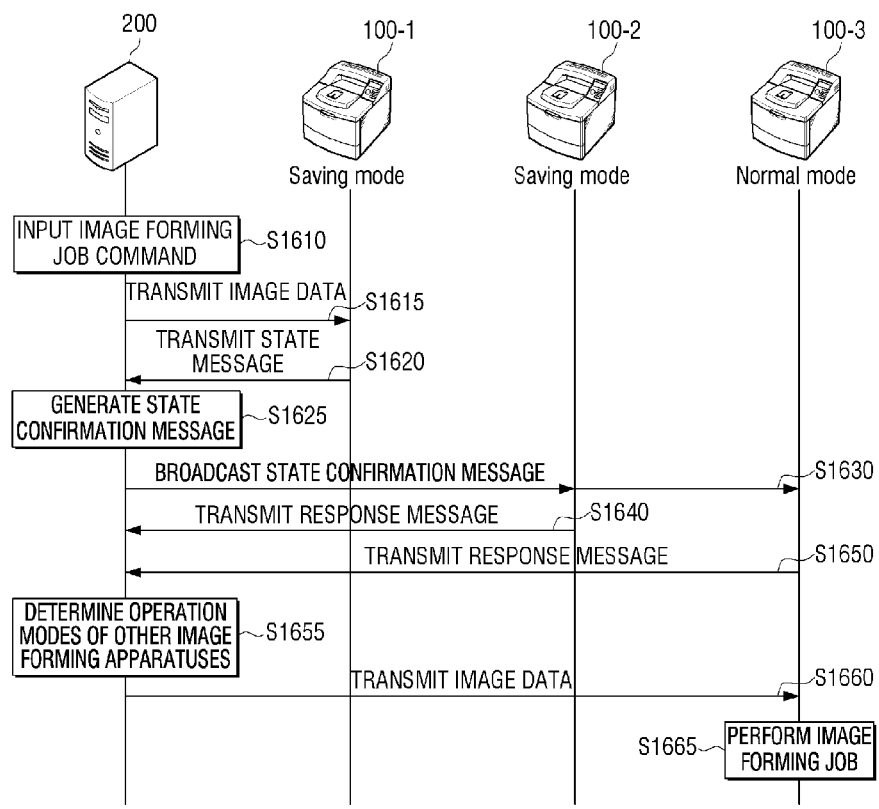
FIGS. 16 to 18 are sequence views provided to explain a method of performing an image forming job according to various exemplary embodiments of the present general inventive concept.

FIG. 16 is a sequence view provided to explain a method of performing an image forming job according to a ninth exemplary embodiment. FIG. 16 is an exemplary embodiment where the host apparatus 200 handles an image forming job by determining the operation mode of other image forming apparatuses 100-2, 100-3 when the first image forming apparatus 100-1 is in a power saving mode.

First, the host apparatus 200 receives a command for an image forming job at operation S1610. In this case, the image forming job command may be any of various image forming job commands such as, for example, a printing command or a fax printing command. When an image forming job command is received, the host apparatus 200 may generate image data according to the image forming job command.

Subsequently, the host apparatus 200 transmits the generated image data to the first image forming apparatus 100-1, which is set as default at operation S1615. In another exemplary embodiment, the host apparatus 200 may transmit a state confirmation message for inquiring the present operation mode without transmitting the generated image data directly.

The first image forming apparatus 100-1 checks that its present operation mode is a power saving mode and transmits a state message to the host apparatus 200 at operation S1620. In this case, the state message may include information that the present operation mode of the first image forming apparatus 100-1 is a power saving mode.

Subsequently, the host apparatus 200 generates a state confirmation message after determining the present mode of the first image forming apparatus 100-1, which is set as default, is a power saving mode at operation S1625. In this case, the state confirmation message may include a request for information regarding the present modes of other image forming apparatuses.

The host apparatus 200 broadcasts the generated state confirmation message to the second image forming apparatus 100-2 and the third image forming apparatus 100-3 at operation S1630.

Once the state confirmation message is received, the second image forming apparatus 100-2 and the third image forming apparatus 100-3 transmit a response message including their present mode information to the host apparatus 200, respectively, at operations S1640, S1650.

The host apparatus 200 determines the present modes of other image forming apparatuses 100-2, 100-3 using the response message at operation S1655. Specifically, the host apparatus 200 may determine that the present operation mode of the second image forming apparatus 100-2 is a power saving mode and the present operation mode of the third image forming apparatus 100-3 is a normal mode by analyzing the response message received from the other image forming apparatuses 100-2, 100-3.

Once the modes of other image forming apparatuses 100-2, 100-3 are determined, in this case the host apparatus 200 transmits image data to the third image forming apparatus 100-3, which is presently in a normal mode at operation S1660.

After the image data is received, the third image forming apparatus 100-3 performs an image forming job using the image data at operation S1665.

In this case, the host apparatus 200 directly transmits the image data to the third image forming apparatus 100-3 and thus, the third image forming apparatus 100-3 need not transmit a job performance message to the host apparatus 200.

If the amount of jobs in the third image forming apparatus 100-3 exceeds a predetermined value, however, the host apparatus 200 may transmit the image data to the first image forming apparatus 100-1. In this case, the first image forming apparatus 100-1 may convert its operation mode from the power saving mode to a normal mode and perform an image forming job using the transmitted image data.

Figure 17:
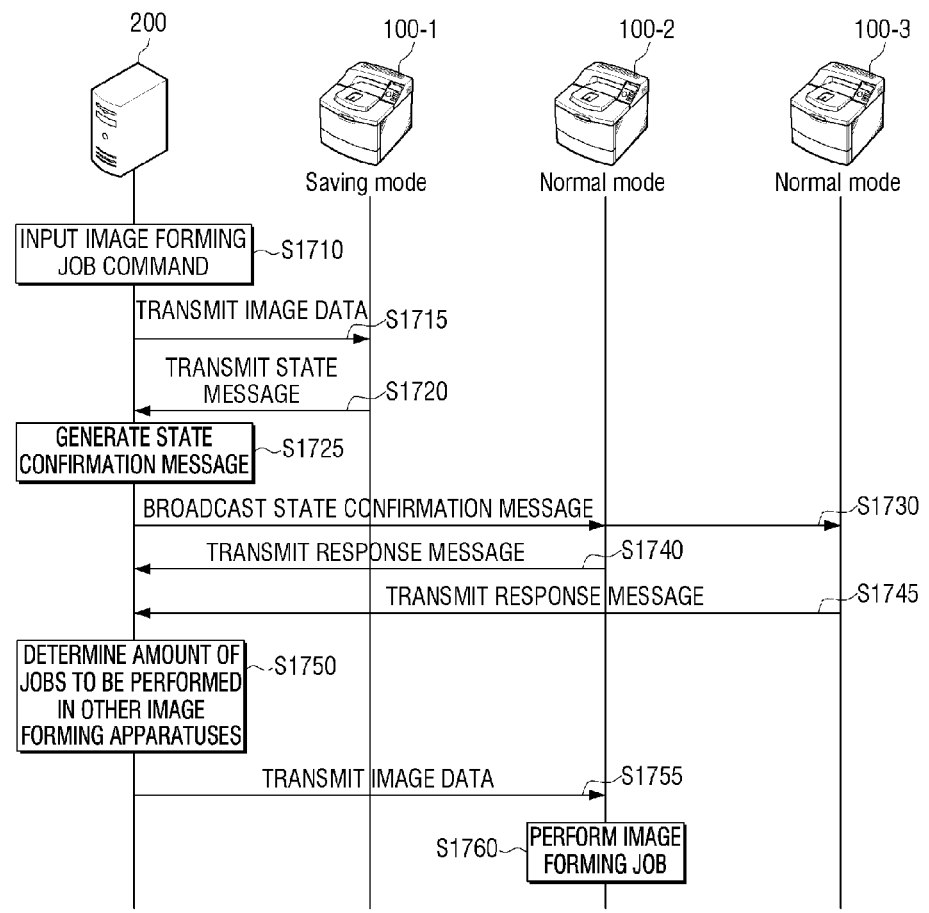

FIG. 17 is a sequence view provided to explain a method of performing an image forming job according to a tenth exemplary embodiment. FIG. 17 is an exemplary embodiment where the host apparatus 200 handles an image forming job by determining the amount of jobs waiting to be performed in other image forming apparatuses which are in a normal mode, if there are a plurality of image forming apparatuses which are in a normal mode from among other image forming apparatuses 100-2, 100-3.

First, the host apparatus 200 receives a command for an image forming job at operation S1710. In this case, the image forming job command may be any of various image forming job commands such as, for example, a printing command or a fax transmission command. If an image forming job command is received, the host apparatus 200 may generate image data according to the image forming job command.

Subsequently, the host apparatus 200 transmits the generated image data to the first image forming apparatus 100-1, which is set as default at operation S1715.

The first image forming apparatus 100-1 checks whether its operation mode is a power saving mode and transmits a state message to the host apparatus 200 at operation S1720. In this case, the state message may include information that the present operation mode of the first image forming apparatus 100-1 is a power saving mode.

Subsequently, the host apparatus 200 generates a state confirmation message after determining that the first image forming apparatus 100-1, which is set as default, is presently in a power saving mode at operation S1725. In this case, the state confirmation message may include a request for information regarding the modes of other image forming apparatuses.

The host apparatus 200 broadcasts the generated state confirmation message to the second image forming apparatus 100-2 and the third image forming apparatus 100-3 at operation S1730.

After the state confirmation message is received, the second image forming apparatus 100-2 and the third image forming apparatus 100-3 transmit a response message including their present mode information and printing standby time to the host apparatus 200, respectively, at operation S1740 and S1745.

The host apparatus 200 determines the amount of jobs of other image forming apparatuses 100-2, 100-3 using the response message at operation S1750. Additionally, the host apparatus 100 determines the operation modes of other image forming apparatuses 100-2, 100-3 by analyzing the response message received from the other image forming apparatuses 100-2, 100-3. Subsequently, the host apparatus 200 may determine that both the second image forming apparatus 100-2 and the third image forming apparatus 100-3 are presently in a normal mode, and determine the amount jobs to be performed in the second image forming apparatus 100-2 and the third image forming apparatus 100-3, respectively.

The host apparatus 200 determines which apparatus has a least amount of jobs waiting to be performed between the second image forming apparatus 100-2 and the third image forming apparatus 100-3 to decide on the image forming apparatus to perform the image forming job. For example, if the printing standby time of the second image forming apparatus 100-2 is two (2) minutes and the printing standby time of the third image forming apparatus 100-3 is five (5) minutes, the host apparatus 200 may decide that the second image forming apparatus 100-2 with less number of pages waiting to be printed perform an image forming job.

After determining the amount of jobs waiting to be performed in other image forming apparatuses 100-2, 100-3, the host apparatus 200 transmits the image data to the second image forming apparatus 100-2 in this case, concluding that it has the least amount of jobs waiting to be performed at operation S1755.

Once the second image forming apparatus 100-2 receives the image data, it performs the image forming job using the image data at operation S1760.

If there are a plurality of other image forming apparatuses 100-2, 100-3 which are in a normal mode and the amount of jobs waiting to be performed in all of the image forming apparatuses 100-2, 100-3 exceeds a predetermined value, the host apparatus 200 may transmit the image data to the first image forming apparatus 100-1. In this case, the first image forming apparatus 100-1 may convert its operation mode to a normal mode and perform an image forming job.

Figure 18:
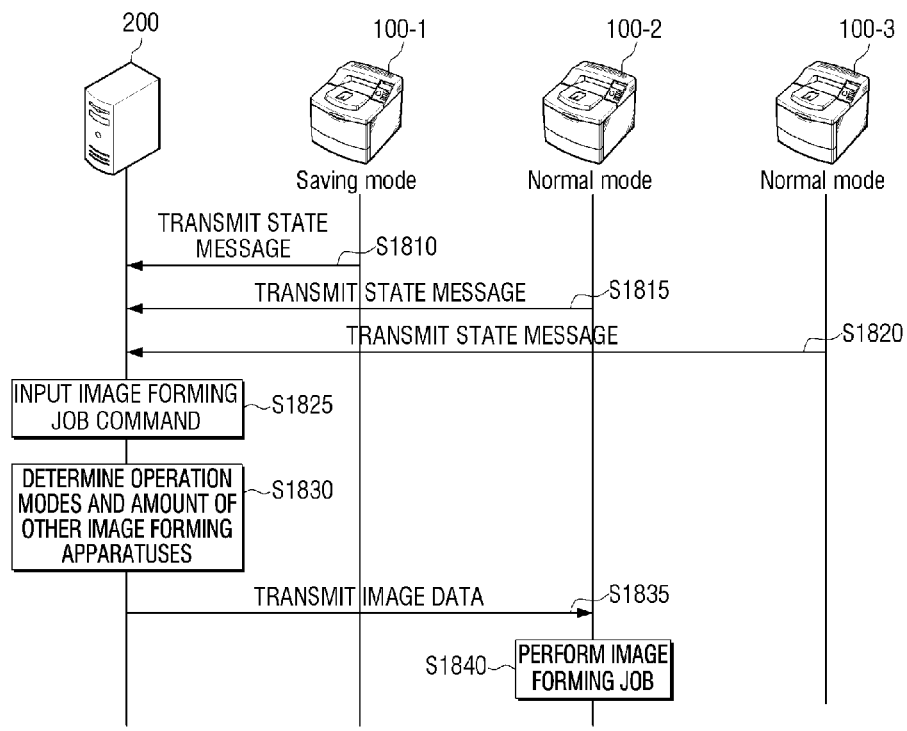

FIG. 18 is a sequence view provided to explain a method of performing an image forming job according to an eleventh exemplary embodiment. FIG. 18 is an exemplary embodiment where the host apparatus 200 handles an image forming job when it has information regarding the image forming apparatuses 100-1, 100-2, 100-3 in advance.

First, each of the image forming apparatuses, e.g., 100-1, 100-2, 100-3, transmits a state message to the host apparatus 200 at operations S1810, S1815, and S1820. In this case, the image forming apparatuses 100-1, 100-2, 100-3 may transmit a state message to the host apparatus 200 on a regular or non-regular basis. Herein, the state message includes mode information or state information of the image forming apparatuses 100-1, 100-2, 100-3.

The host apparatus 200 stores the mode information and the state information of the image forming apparatuses 100-1, 100-2, 100-3 using the state messages transmitted from the image forming apparatuses 100-1, 100-2, 100-3. In this case, the host apparatus 200 may update the mode information and the state information of image forming apparatuses 100-1, 100-2, 100-3 according to the state message which is transmitted on a regular or non-regular basis.

The host apparatus 200 receives a command for an image forming job at operation S1825. If the image forming job command is received, the host apparatus 200 generates image data corresponding to the image forming job command. In this case, the image data may be in a format which can be used in an image forming apparatus.

Subsequently, the host apparatus 200 determines the modes and the amount of jobs waiting to be performed in image forming apparatuses at operation S1830. Specifically, the host apparatus 200 may determine, for example, that the first image forming apparatus 100-1 is in a power saving mode, the second image forming apparatus 100-2 is in a normal mode, the number of pages waiting to be printed in the second image forming apparatus 100-2 is ten (10), the third image forming apparatus 100-3 is in a normal mode, and the number of pages waiting to be printed in the third image forming apparatus 100-3 is fifteen (15) based on the mode information and the state information regarding the image forming apparatuses 100-1, 100-2, 100-3 stored in the storage unit (not shown).

Subsequently, the host apparatus 200 transmits the image data to the second image forming apparatus 100-2 which is presently in a normal mode and has the minimum amount of jobs waiting to be performed from among the image forming apparatuses at operation S1835.

Once the second image forming apparatus 100-2 receives the image data, it performs the image forming job using the image data at operation S1840.

In FIG. 18, the host apparatus 200 receives a state message from the image forming apparatuses on a regular or non-regular basis before receiving an image forming job command, but this is only an example. The host apparatus 200 may receive a state message by broadcasting a state confirmation message to the image forming apparatuses after receiving an image forming job command.

Furthermore, the host apparatus 200 may perform not only the functions as explained above with reference to FIGS. 15 to 18, but also handle the search and selection functions which are handled by the first image forming apparatus 100-1 as explained above with reference to FIGS. 9 to 12. For example, as described above with reference to FIG. 9, the host apparatus 200 may search for an image forming apparatus which satisfies the predetermined conditions using information regarding the image forming apparatuses stored in the storage unit and transmit the image data to an image forming apparatus which is presently in a normal mode from among the searched image forming apparatuses. In addition, as explained above with reference to FIG. 10, the host apparatus 200 may search for an image forming apparatus which satisfies the predetermined conditions by analyzing information regarding the image forming apparatuses and transmit the image data to an image forming apparatus which is presently in a normal mode from among the searched image forming apparatuses. Alternatively, as explained above with reference to FIG. 11, the host apparatus 200 may determine the type of the power saving mode of the first image forming apparatus 100-1 and transmit the image data to an image forming apparatus which is presently in a normal mode only when the first image forming apparatus 100-1 is in a predetermined power saving mode. As explained above with reference to FIG. 12, the host apparatus may transmit the image data to another image forming apparatus which is presently in a normal mode only when the first image forming apparatus 100-1 is entered into an external apparatus transmission mode.

Figure 19:
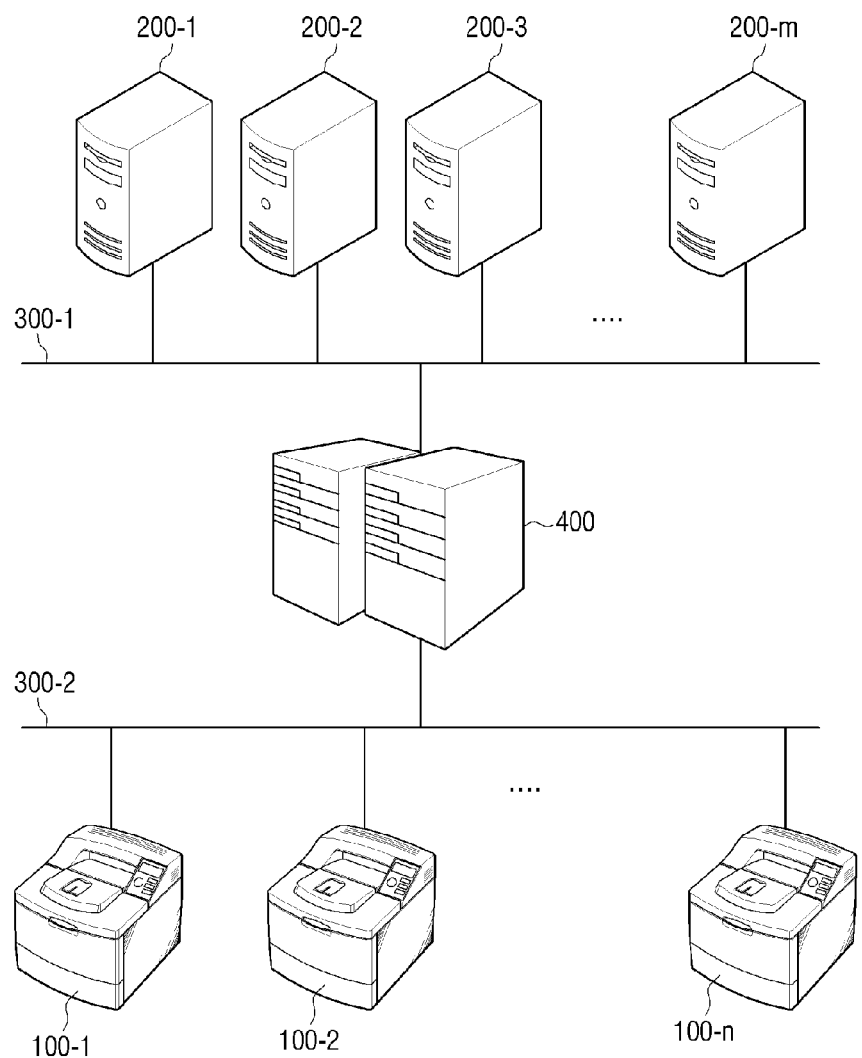
FIG. 19 is a view illustrating an image forming system according to an exemplary embodiment of the present general inventive concept.

Hereinafter, a method of handling an image forming job in an image forming system including a server will be explained with reference to FIGS. 19 to 23. FIG. 19 is a view illustrating an image forming system according to another exemplary embodiment. As illustrated in FIG. 19, an image forming system 20 comprises "n" image forming apparatuses 100 (100-1, 100-2, . . . , 100-n), "m" host apparatuses 200 (200-1, 200-2, . . . , 200-m), and a server 400. In this case, in the image forming system 20, "n" image forming apparatuses 100 (100-1, 100-2, . . . , 100-n), "m" host apparatuses 200 (200-1, 200-2, . . . , 200-m), and the server 400 may be connected via network 300-1, 300-2.

Herein, the network 300-1, 300-2 may be realized, for example and without limitation, as a LAN, a wireless LAN, a sharer such as a HUB, or an Internet network.

The server 400 manages an image forming job of the image forming system 20. In particular, the server 400 may store an image forming apparatus management program.

The server 400 may search the image forming apparatus 100 and the host apparatus 200 to perform an image forming job. The image forming apparatus 100 and the host apparatus 200 may be searched using, for example, broadcasting, Service Location Protocol (SLP) using multi-casting, multi-cast DNS, LDAP, IP scanning, Simple Network Management Protocol, Local Device Discover, or search list of other printer management programs.

In addition, the server 400 may receive image data corresponding to an image forming job from the host apparatus 200 and transmit the image data to a specific image forming apparatus 100.

Specifically, if the server 400 receives image data from the host apparatus 200, the server 400 may determine the operation mode of the first image forming apparatus 100-1 which corresponds to the host apparatus 200. In this case, the server 400 may determine the operation mode of the first image forming apparatus 100-1 through a state message received from image forming apparatuses on a regular or non-regular basis. Alternatively, when the image data is received, the server 400 may determine the operation mode of the first image forming apparatus 100-1 by broadcasting a state confirmation message to the image forming apparatuses and analyzing the mode information of the image forming apparatuses included in the response messages.

If it is determined that the present operation mode of the first image forming apparatus 100-1 is a power saving mode, the server 400 may transmit image data received from the host apparatus 200 to another image forming apparatus which is presently in a normal mode from among the other image forming apparatuses.

Figure 20:
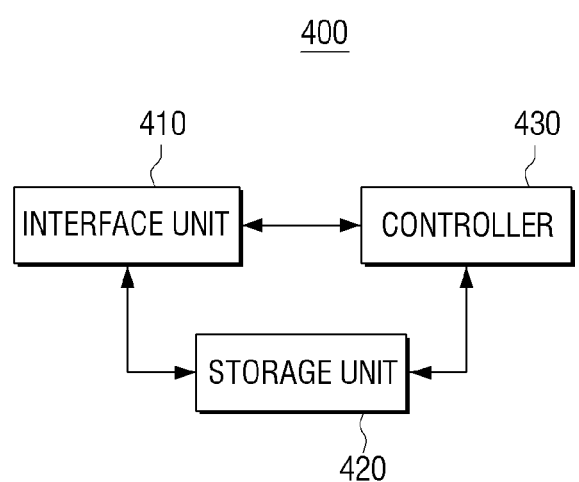
FIG. 20 is a block diagram illustrating configuration of a server to perform an image forming job according to an exemplary embodiment of the present general inventive concept.

FIG. 20 is a block diagram illustrating configuration of a server to handle an image forming job according to an exemplary embodiment. As illustrated in FIG. 20, the server 400 comprises an interface unit 410, a storage unit 420, and a controller 430.

The interface unit 410 performs communication with at least one of host apparatuses 200 (200-1, 200-2, ..., 200-*m*) and a plurality of image forming apparatuses 100 (100-1, 100-2, ..., 100-*n*). In this case, the interface unit 410 may be realized as, for example, a USB interface, LAN, wireless LAN, Bluetooth, sharer such as HUB or Internet network. In addition, the interface unit 410 may be realized as at least one module to perform communication with a plurality of external apparatuses.

In particular, the interface unit 410 may receive image data from the host apparatus 200, and transmit the received image data to one of a plurality of image forming apparatuses 100 (100-1, 100-2, ..., 100-*n*).

The storage unit 420 stores various data and programs to operate the server 400. In particular, the storage unit 420 may store information regarding a plurality of image forming apparatuses 100 (100-1, 100-2, ..., 100-*n*). In this case, the information regarding the plurality of image forming apparatuses 100 (100-1, 100-2, ..., 100-*n*) may be obtained through a state message transmitted from a plurality of image forming apparatuses 100 (100-1, 100-2, ..., 100-*n*) on a regular or non-regular basis.

In particular, the information regarding a plurality of image forming apparatuses 100 (100-1, 100-2, ..., 100-*n*) may include not only information regarding the present operation mode of each of a plurality of image forming apparatuses 100 (100-1, 100-2, ..., 100-*n*) but also information regarding the operation state, such as the amount of jobs waiting to be performed.

The controller 430 controls overall operations of the server 400. In particular, if image data is transmitted from an external host apparatus 200, the controller 430 determines the operation mode of the image forming apparatus 100 that is set as default with respect to the host apparatus 200 which transmits the image data.

If the present operation mode of the image forming apparatus 100 is a normal mode, the controller 430 controls the interface unit 410 to transmit the received image data to the image forming apparatus 100.

However, if the present operation mode of the image forming apparatus 100 is a power saving mode, the controller 430 controls the interface unit 410 to transmit the received image data to an image forming apparatus which operates in a normal mode from among other available image forming apparatuses instead of the image forming apparatus 100. In this case, if there are a plurality of other image forming apparatuses presently operating in a normal mode, the controller 430 may transmit the image data to the image forming apparatus presently operating in a normal mode and having the minimum amount of jobs waiting to be performed.

In addition, the controller 430 may transmit information regarding an image forming apparatus which has performed an image forming job to the host apparatus 200. Accordingly, a user may check which apparatus has performed an image forming job through the host apparatus 200.

As described above, unnecessarily waking up an image forming apparatus which is in a power saving mode can be prevented through the server 400, thereby preventing waste of power.

Hereinafter, a method of performing an image forming job in the image forming system 20 including a server will be explained with reference to FIGS. 21 to 23.

Figure 21:
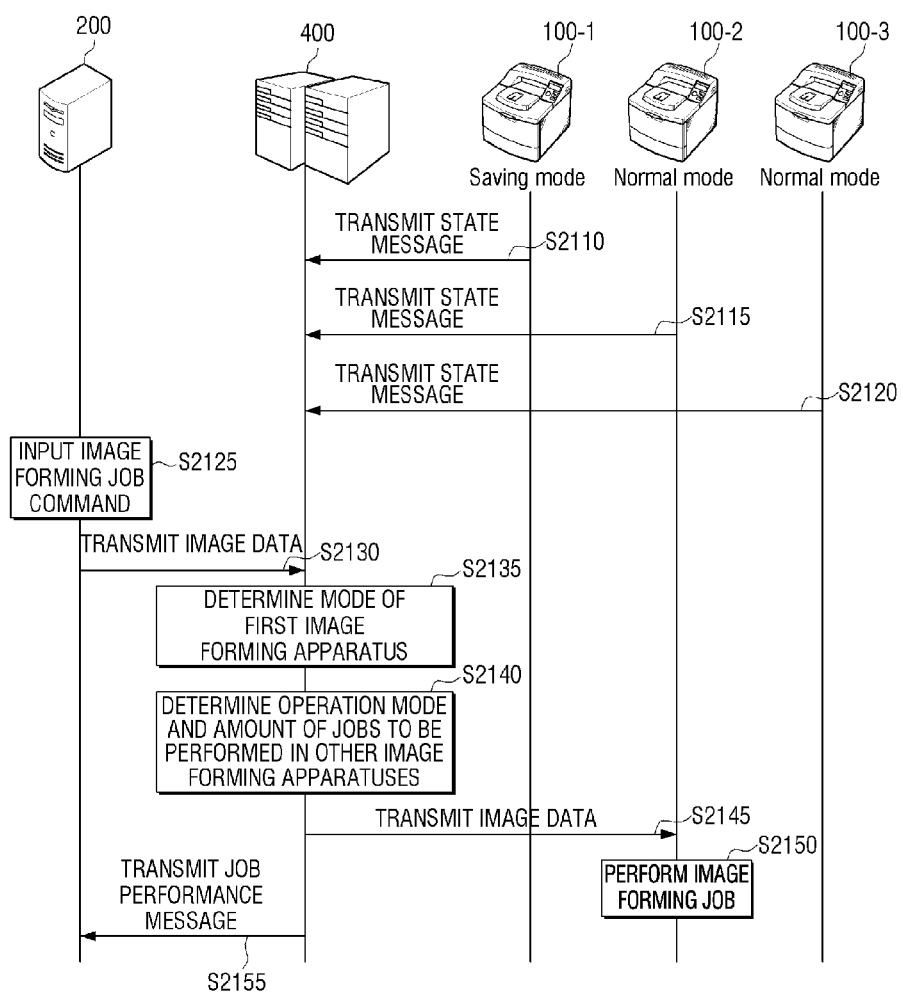
FIGS. 21 to 23 are sequence views provided to explain a method of performing an image forming job according to various exemplary embodiments of the present general inventive concept.

FIG. 21 is a sequence view provided to explain a method of performing an image forming job according to a twelfth exemplary embodiment. FIG. 21 is an exemplary embodiment for performing an image forming job in another image forming apparatus when the host apparatus 200 directly transmits image data to the server 400.

First, the server 400 receives a state message from the first image forming apparatus 100-1 to the third image forming apparatus 100-3 at operations S2110, S2115, and S2120. In this case, the server 400 may receive a state message on a regular or non-regular basis. In addition, the state message may include the mode information and the state information of the image forming apparatuses (100-1 ... 100-3).

If the state message is received from the image forming apparatuses (100-1 ... 100-3), the server 400 may store the mode information and the state information regarding the image forming apparatuses (100-1 ... 100-3). In this case, if the state message is received from the image forming apparatuses (100-1 ... 100-3) on a regular basis, the server 400 may update the mode information and the state information of the image forming apparatuses (100-1 ... 100-3) on a regular basis.

Subsequently, the host apparatus 200 receives a command for an image forming job from a user at operation S2125 and generates image data corresponding to the image forming job command.

The host apparatus 200 transmits the generated image data to the server 400 at operation S2130.

The server 400 determines the operation mode of the first image forming apparatus 100-1 at operation S2135. In this case, the first image forming apparatus 100-1 may be an image forming apparatus which is set as default with respect to the host apparatus 200.

If it is determined that the first image forming apparatus 100-1 is in a power saving mode, the server 400 determines the operation mode and the amount of jobs waiting to be performed in other image forming apparatuses 100-2, 100-3 at operation S2140. For example, the server 400 may determine that the present operation mode of the second image forming apparatus 100-2 is a normal mode, the number of pages waiting to be printed therein is 10, the operation mode of the third image forming apparatus 100-3 is a normal mode, and the number of pages waiting to be printed therein is 25 through the pre-stored mode information and the state information of the second and the third image forming apparatuses 100-2, 100-3.

In addition, the server 400 transmits the image data to the second image forming apparatus 100-2 which is presently in a normal mode and has the minimum amount of jobs waiting to be performed from among the other image forming apparatuses 100-2, 100-3 at operation S2145.

Once the image data is received, the second image forming apparatus 100-2 performs the image forming job using the image data at operation S2150.

After the image forming job is performed, the server 400 may transmit a job performance message including information regarding the second image forming apparatus 100-2 which has performed the image forming job to the host apparatus 200 at operation S2155. Accordingly, a user may check which image forming apparatus has performed the image forming job through the host apparatus 200.

Figure 22:
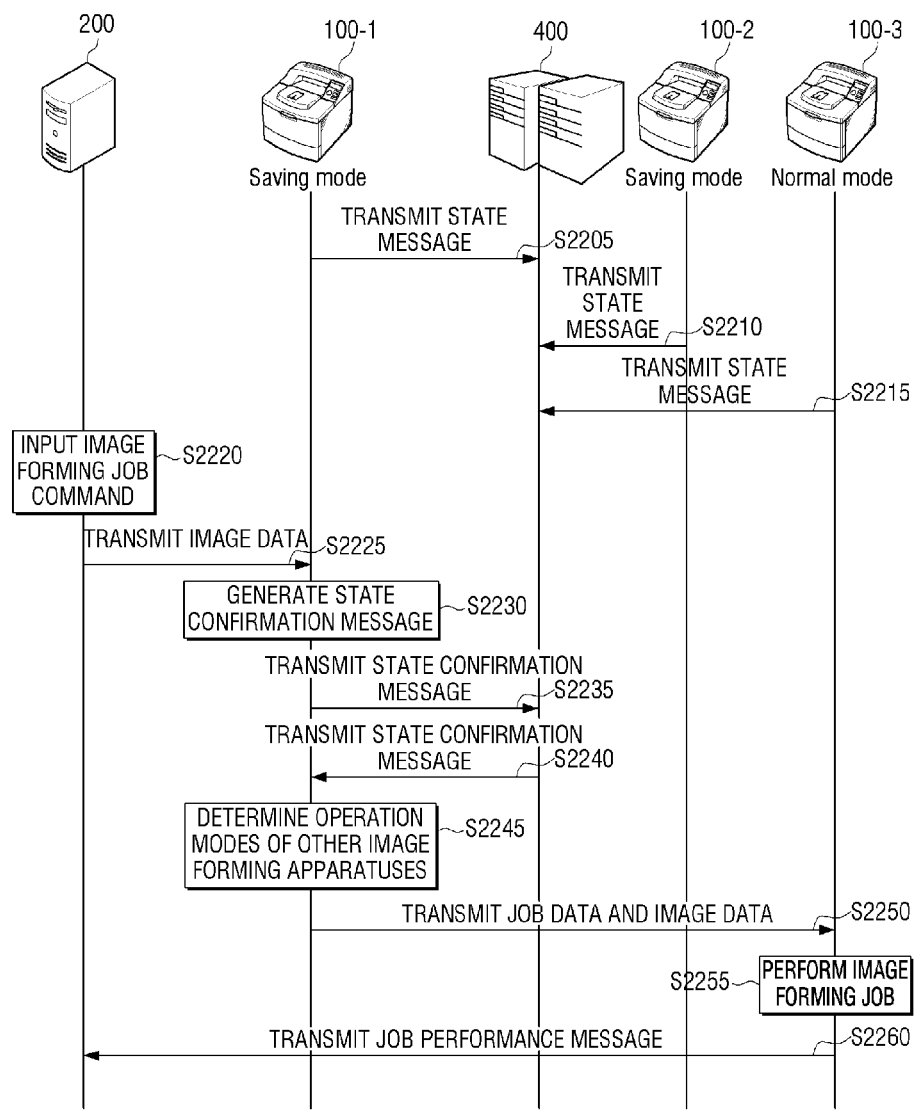

FIG. 22 is a sequence view provided to explain a method of performing an image forming job according to a thirteenth exemplary embodiment. FIG. 22 is an exemplary embodiment wherein the first image forming apparatus 100-1 performs an image forming job using the server 400 when the host apparatus 200 transmits the image data to the first image forming apparatus 100-1.

First, the server 400 receives a state message from the first image forming apparatus 100-1 to the third image forming apparatus 100-3 at operations S2205, S2210, and S2215. In this case, the server 400 may receive a state message on a regular or non-regular basis. In addition, the state message includes the mode information and the state information of the image forming apparatuses (100-1 . . . 100-3).

Once the state message is received from the image forming apparatuses (100-1 . . . 100-3), the server 400 may store the mode information and the state information regarding the image forming apparatuses (100-1 . . . 100-3). In this case, if the state message is received from the image forming apparatuses (100-1 . . . 100-3) on a regular basis, the server 400 may update the mode information and the state information of the image forming apparatuses (100-1 . . . 100-3) on a regular basis.

Subsequently, the host apparatus 200 receives a command for an image forming job from a user at operation S2220 and generates image data corresponding to the image forming job command.

The host apparatus 200 transmits the generated image data to the first image forming apparatus 100-1, which is set as default at operation S2225.

The first image forming apparatus 100-1 checks whether its present operation mode is a power saving mode and generates a state confirmation message at operation S2230. In this case, the state confirmation message may include a request for information regarding the present operation mode of other image forming apparatuses 100-2, 100-3 and a request for information regarding the present state of other image forming apparatuses 100-2, 100-3.

Subsequently, the first image forming apparatus 100-1 transmits the state confirmation message to the server 400 at operation S2235.

The server 400 generates a state message using the pre-stored mode information and state information regarding other image forming apparatuses 100-2, 100-3 and transmits the generated state message to the first image forming apparatus 100-1 at operation S2240.

Subsequently, the first image forming apparatus 100-1 determines the modes of other image forming apparatuses at operation S2245. Specifically in this case, the first image forming apparatus 100-1 may determine that the present operation mode of the second image forming apparatus 100-2 is a power saving mode and the present operation mode of the third image forming apparatus 100-3 is a normal mode using the mode information of other image forming apparatuses 100-2, 100-3 included in the state message.

The first image forming apparatus 100-1 transmits job data and image data to the third image forming apparatus 100-3 of which operation mode is a normal mode at operation S2250.

Once the job data and the image data are received, the third image forming apparatus 100-3 performs the image forming job using the image data at operation S2255.

Subsequently, the third image forming apparatus 100-3 transmits a job performance message to the host apparatus 200 at operation S2260. By receiving the job performance message, the host apparatus 200 may inform a user that the image forming job has been performed by the third image forming apparatus 100-3. In another exemplary embodiment, the third image forming apparatus 100-3 may transmit a job performance message to the server 400.

Figure 23:
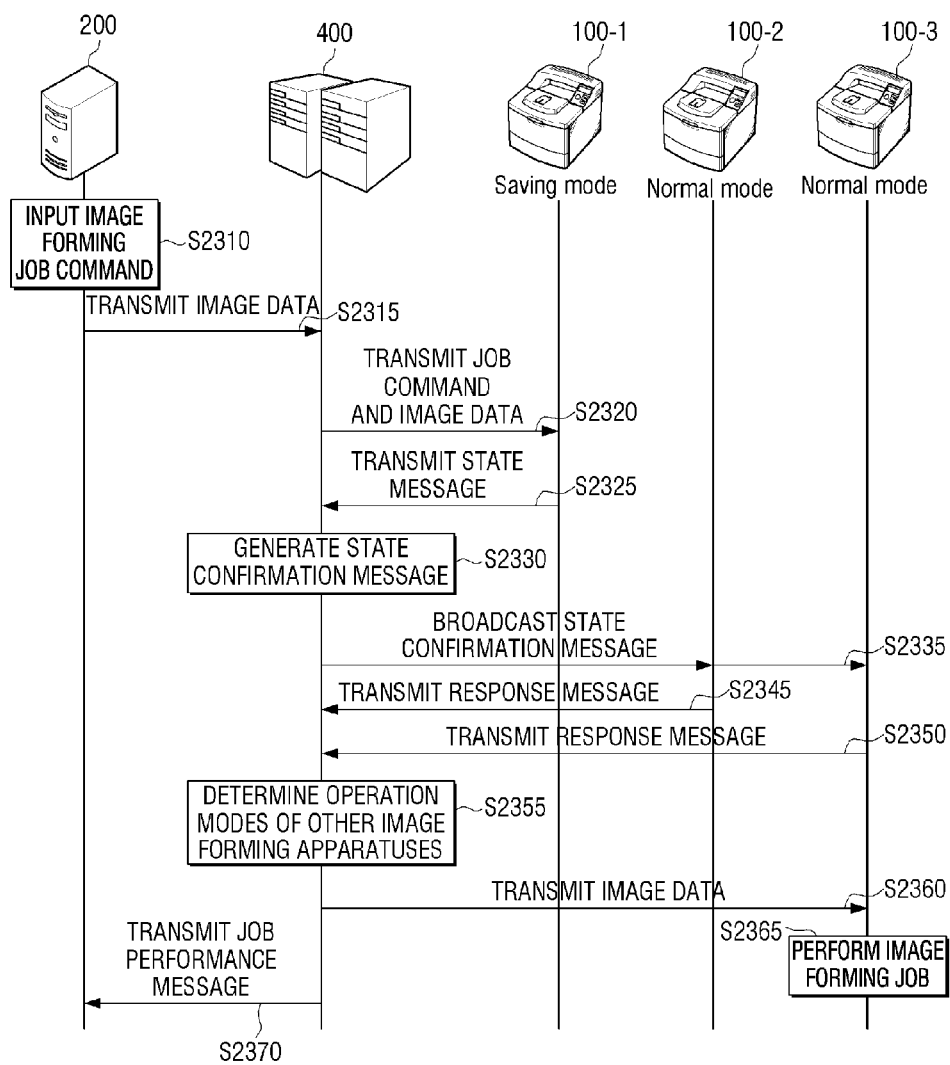

FIG. 23 is a sequence view provided to explain a method of performing an image forming job according to a fourteenth exemplary embodiment. FIG. 23 is an exemplary embodiment wherein a server determines the modes of multiple image forming apparatuses by broadcasting a state confirmation message to the image forming apparatuses and operates to allow an image forming apparatus which is presently in a normal mode perform an image forming job when the host apparatus 200 directly transmits the image data to the server 400.

First, the host apparatus 200 receives a command for an image forming job from a user at operation S2310 and generates image data corresponding to the image forming job command.

The host apparatus 200 transmits the generated image data to the server 400 which manages the image forming system 20 at operation S2315.

Subsequently, the server 400 transmits the received image data to the first image forming apparatus 100-1 which is set as default with respect to the host apparatus 200 at operation S2320.

The first image forming apparatus 100-1 checks whether its present operation mode is a power saving mode and in this case generates a state message including information that its operation mode is a power saving mode and transmits the generated state message to the server 400 at operation S2325.

The server 400 confirms that the first image forming is in a power saving mode through the state message and generates a state confirmation message including a request for information regarding the operation mode of other image forming apparatuses 100-2, 100-3 at operation S2330.

Subsequently, the server 400 broadcasts the state confirmation message to the second image forming apparatus 100-2 and the third image forming apparatus 100-3, respectively at operation S2335.

In response to the state confirmation message, the second image forming apparatus 100-2 and the third image forming apparatus 100-3 each transmit a response message including information regarding their operation modes to the server 400 at operations S2345 and S2350.

The server 400 determines the operation modes of the other image forming apparatuses 100-2, 100-3 using the response message at operation S2355. Specifically, the server 400 may determine that the second image forming apparatus 100-2 is presently in a power saving mode and the third image forming apparatus 100-3 is presently in a normal mode based on the response message including the information regarding the operation modes.

The server 400 thus transmits the image data to the third image forming apparatus 100-3 which is presently in a normal mode from among the available image forming apparatuses 100-2, 100-3 at operation S2360.

Once the image data is received, the third image forming apparatus 100-3 performs the image forming job using the image data at operation S2365.

After the image forming job is performed, the server 400 transmits a job performance message including information regarding the second image forming apparatus which has performed the image forming job to the host apparatus 200 at operation S2370. Accordingly, a user may check which image forming apparatus has performed the image forming job through the host apparatus 200.

The server 400 may perform not only the functions of the server 400 as explained above with reference to FIGS. 21 to 23 but also the searching and selecting functions of the first image forming apparatus 100-1 as explained above with reference to FIGS. 9 to 12. For example, as illustrated in FIG. 9 the server 400 may search for image forming apparatuses which satisfy predetermined conditions using information regarding image forming apparatuses which are pre-stored in the storage unit, and transmit the image data to an image forming apparatus which is presently in a normal mode from among the searched image forming apparatuses. In addition, as illustrated in FIG. 10, the server 400 may search for image forming apparatuses which satisfy predetermined conditions by analyzing the received information regarding image forming apparatuses and transmit the image data to an image forming apparatus which is presently in a normal mode from among the searched image forming apparatuses. Alternatively, the server 400 may determine the type of power saving mode of the first image forming apparatus 100-1 and transmit the image data to another image forming apparatus which is presently in a normal mode only when the power saving mode is a predetermined type of power saving mode. As explained above with reference to FIG. 12, the server 400 may transmit the image data to another image forming apparatus which is presently in a normal mode only when an external apparatus transmission mode is entered into.

In FIGS. 21 to 23, it is assumed that the host apparatus 200 is a desktop PC, but this is only an example. The host apparatus 200 may be realized as a portable apparatus such as a smart phone or a tablet PC. In particular, if the host apparatus 200 is realized as a portable apparatus, the image forming system 20 may be realized as a cloud printing system or a mobile printing system.

For example, if a portable apparatus transmits an image forming job to a server wirelessly, the server may determine which is an optimum image forming apparatus to perform the image forming job in the same way as explained above with reference to FIGS. 21 to 23, and handle the image forming job through the optimum image forming apparatus. In addition, a user having the portable apparatus may check which image forming apparatus has performed the image forming job as the server transmits a job performance message including information regarding the image forming apparatus which has performed the image forming job to the portable apparatus.

As described above, a user may remotely perform an image forming job more easily and conveniently using a portable apparatus by a cloud printing system or a mobile printing system.

Figure 24:
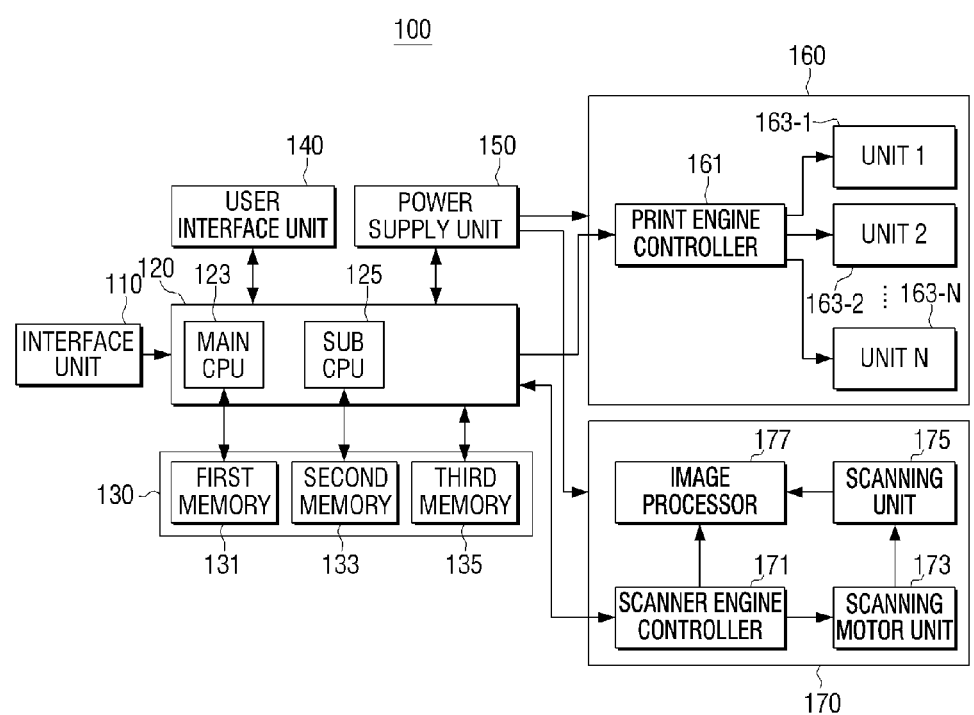
FIG. 24 is a block diagram illustrating configuration of an image forming apparatus in detail according to an exemplary embodiment of the present general inventive concept.

FIG. 24 is a block diagram illustrating an example image forming apparatus 100 including various elements according to another exemplary embodiment. In particular, FIG. 24 is an exemplary embodiment wherein the controller 120 of the image forming apparatus 100 comprises a main CPU 123 and a sub CPU 125.

As illustrated in FIG. 24, the image forming apparatus 100 comprises an interface unit 110, a controller 120, a storage unit 130, a user interface unit 140, a power supply unit 150, an image forming unit 160 and a scanning unit 170. It is assumed that the image forming apparatus in FIG. 24 is a multifunctional printer (MFP) which performs at least two functions out of a printing function, a scanning function, a copying function, and/or a faxing function. In the case of a general printer, some elements, including the scanning unit 170, may be omitted. In addition, some elements (not shown) such as a bus for exchanging data between elements and a buffer for temporarily storing data may be further added.

The interface unit 110 is connected to the host apparatus 200 or another image forming apparatus via network or local interface to transmit/receive image data. That is, the interface unit 110 may be connected to the host apparatus 200 via local interface or may be connected to a plurality of external image forming apparatuses via other ways, for example, such as by network, by cable or wirelessly. The wireless communication standard may include U.S. IEEE (Institute of Electrical and Electronics Engineers) 802.11 standard, EU hyper LAN standard and Japanese MMAC-PC standard.

The user interface unit 140 receives various selection commands from a user. The user interface unit 140 may include a display panel and may include at least one button. In this case, the display panel may be realized as a touch screen. The user interface unit 140 provides various UI screens, and a user may input a selection command by directly touching a UI screen or manipulating a button on the user interface unit 140. The selection commands may include a command to perform an image forming job, and a command to set various functions of the image forming apparatus 100, change modes, and stop or resume operations.

The power supply unit 150 supplies power to each component of the image forming apparatus 100.

The image forming unit 160 may comprise a print engine controller 161 and a plurality of units (163-1~1630-N) for a printing operation. In the case of a laser printing method of example, the units (163-1~1630-N) may comprise a paper feeding unit, an electrification unit, an exposure unit, a development unit, a transfer unit, a fusing unit, and paper discharging unit. In the case of an ink-jet printing method of example, the units (163-1~1630-N) may comprise a feeding unit, an ink-jet printing head, an ink cartridge, and a discharging unit. The print engine controller 161 controls each of the units (163-1~1630-N) so as to perform printing as the bitmap image provided from the controller 120.

Meanwhile, if a scanning command is received through the user interface unit 140, the controller 120 may control the scanning unit 170 to perform a scanning operation.

The scanning unit 170 may comprise a scanner engine controller 171, a scanning motor unit 173, a scanning unit 175, and an image processor 177.

The scanner engine controller 171 communicates with the controller 120 to control each component of the scanning unit 170 to perform a scanning job. Specifically, if a scanning command is transmitted from the controller 120, the scanner engine controller 171 scans an object by driving the scanning unit 175 and the scanning motor unit 173 and controls the image processor 177 to generate scanning data.

The scanning motor unit 173 moves the scanning unit 175 or papers so that scanning can be performed with respect to the entire parts of the object. That is, the scanning motor unit 173 moves different mediums according to whether the operation method of a scanner is a sheet feed method or a flatbed method. For example, the scanning motor unit 173 moves papers if the operation method is a sheet feed method, and moves the scanning unit 175 if the operation method is a flatbed method. The scanning motor unit 173 may be realized, for example, as a carriage return motor.

The scanning unit 175 scans an object. The scanning unit 175 may comprise an image reading sensor, a lens, and a light source, and CCD or CIS image sensor is generally used for the image reading sensor. The image reading sensor may comprise a photoelectric converter which absorbs reflection light which is emitted from a light source and radiated on the object to generate electric charge, and a signal detector which detects the electric charge generated by the photoelectric converter and converts it to an electric signal (not shown). The electric signal converted by the signal detector is provided to the image processor 177.

The image processor performs processing such as shading, gamma correction, Dot Per Inch (DPI) conversion, edge emphasis, error diffusion, scaling, etc., with respect to image data received from the scanning unit 175 to generate scanning data, considering predetermined resolution, scanning mode, scanning area, enlargement and reduction ratio, etc.

The controller 120 controls overall operations of an image forming apparatus 100 according to data and commands of an external apparatus connected through the interface unit 110 or a user selection command inputted through the user interface unit 140.

Specifically, if a printing command is executed in a printer driver or an application installed in the host apparatus 200, the printer driver of the host apparatus 200 generates image data by converting the corresponding documents to a predetermined printing language. The controller 120 receives such image data through the interface unit 110. The controller 120 converts the image data into a bitmap image consisting of "0" and "1" using a halftone table and provides it to the image forming unit 160 so that it can be printed on a paper.

In particular, the controller 120 comprises the main CPU 123 which operates in a normal mode and the sub CPU 125 which operates in a power saving mode. Specifically, if the present operation mode of the image forming apparatus 100 is a normal mode, an image forming job may be performed by using image data received from the host apparatus 200 as the main CPU 123 is activated. However, if the present operation mode of the image forming apparatus 100 is a power saving mode, the main CPU 123 is inactivated and the sub CPU 125 is activated so that the sub CPU 125 may control the operation of the image forming apparatus 100 using a second memory 133. In particular, the operation of the image forming apparatus in a power saving mode, which was explained above with reference to FIGS. 4 to 23, may be performed by the sub CPU 125.

The storage unit 130 stores various information such as specification, usage state, print data, scan data, pre-processed data, and print history information of the image forming apparatus 100, as well as various application programs and an Operating System (O/S) used in the image forming apparatus 100.

In particular, the storage unit 130 may comprise a first memory 131 which is used in a normal mode, a second memory 133 which is used in a power saving mode, and a third memory 135 as illustrated in FIG. 24. The first memory 131 is a main memory used for operations in a normal mode and may be realized as a non-volatile memory. For example, the first memory may be realized as Dynamic RAM (DRAM) and may store programs and applications which are capable of performing network communication in a normal mode. The second memory 133 may be used for operations in a power saving mode which is driven using less power than in a normal mode. For example, the second memory 133 may store programs and applications which can support a power saving mode, and may be realized as one of Static RAM (SRAM) and Synchronous Dynamic Random Access Memory (SDRAM). In addition, RAMBus, DRAM, DDR-SDRAM may be used. The third memory 135 may be used to store codes which are necessary to realize a normal mode, and may store various other data. The third memory 135 may be realized as at least one of a Read Only Memory (ROM) and a flash memory.

In particular, the second memory 133 according to an exemplary embodiment may store network address information of the host apparatus 200 and other image forming apparatuses so as to perform communication with the external host apparatus 200 and other image forming apparatuses even in a power saving state.

Further, the second memory 133 may store information regarding an image forming apparatus which can be used for each user in order to search for another image forming apparatus to which image data is to be transmitted, and may store information regarding an image forming apparatus which is set by a user, location information of a host apparatus and other image forming apparatuses, and information regarding a job performance capability of other image forming apparatuses in order to transmit image data in a power saving mode.

FIG. 24 illustrates only the first to the third memories 131, 133, 135, respectively, but the number and the size of the memories may vary depending on the characteristic of the image forming apparatus 100.

Hereinafter, a method of displaying a power state of each component of an image forming apparatus will be explained with reference to FIGS. 25 to 29.

Figure 25:
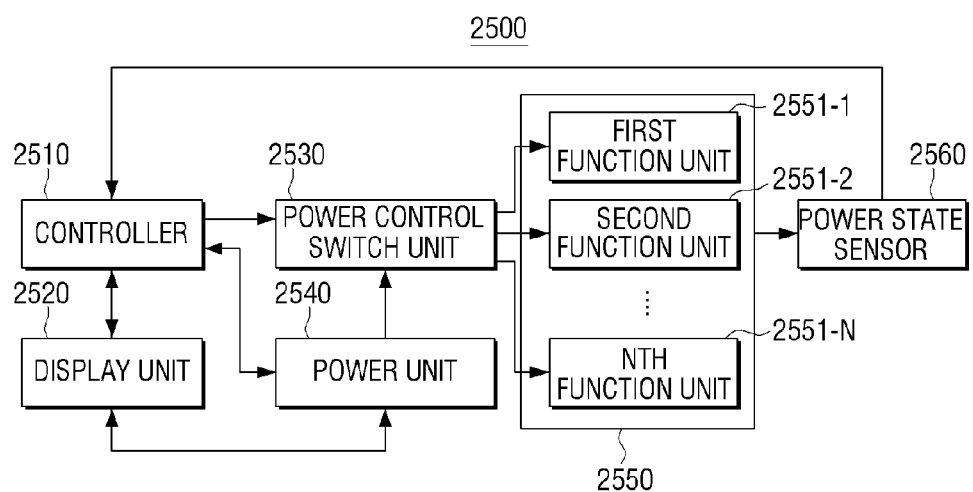
FIG. 25 is a block diagram illustrating configuration of an image forming apparatus according to an exemplary embodiment of the present general inventive concept.

FIG. 25 is a block diagram illustrating configuration of an image forming apparatus according to another exemplary embodiment. As illustrated in FIG. 25, an image forming apparatus 2500 comprises a controller 2510, a display unit 2520, a power control switch unit 2530, a power unit 2540, a function unit 2550, and a power state sensor 2560.

The controller 2510 controls overall operations of the image forming apparatus 2500. In particular, the controller 2510 generates a power control signal to provide power to a plurality of function units (2551-1, 2551-2, . . . , 2551-N), which perform image forming jobs. Additionally, the controller 2510 transmits the power control signal to the power unit 2540 and the power control switch unit 2530.

In particular, if an image forming job is received from a user, the controller 2510 may generate a power control signal to provide power to the function unit 2550 corresponding to the image forming job and transmit the signal to the power unit 2540 and the power control switch unit 2530. For example, if a printing job command is received, the controller 2510 may generate a power control signal to provide power to a function unit (for example, a paper feeding unit, a discharging unit, a fusing unit, etc.) for performing the printing job from among a plurality of function units (2551-1, 2551-2, . . . , 2551-N).

In addition, if an image forming job command from a user is not received in the image forming apparatus 2500 for a predetermined time, the controller 2510 may generate a power control signal to cut off power to the function unit 2550 and transmit it to the power unit 2540 and the power control switch unit 2530. In this case, the controller 2510 may cut off either all function units or only some parts of the function units from among a plurality of function units (2551-1, 2551-2, . . . , 2551-N).

If an error occurs in a specific part of the function unit 2550, the controller 2510 may generate a power control signal to cut off power supply to the function unit where the error occurs and transmit it to the power unit 2540 and the power control switch unit 2530. In general, a depositing unit requires high temperature and high pressure to perform a printing job and if temperature which is higher than a reference temperature is sensed, the controller 2510 may determine that an error has occurred and generate a power control signal not to provide power to the depositing unit and furthermore transmit the power control signal to the power unit 2540 and the power control switch unit 2530.

In addition, the controller 2510 may analyze the power state of each of a plurality of function units (2551-1, 2551-2, . . . , 2551-N) by sensing the power state of the function unit 2550 through the power state sensor 2560 and display the power state of each of the plurality of function units on the display unit 2520.

The display unit 2520 displays information regarding the operation state and the setting state of the image forming apparatus 2500.

In particular, the display unit 2520 may provide the power state information of each of a plurality of function units (2551-1, 2551-2, . . . , 2551-N) as a UI under the control of the controller 2510. In this case, the display unit 2520 may provide power state information regarding not only all of the plurality of function units (2551-1, 2551-2, . . . , 2551-N) but also some part of the function units.

Figure 26:
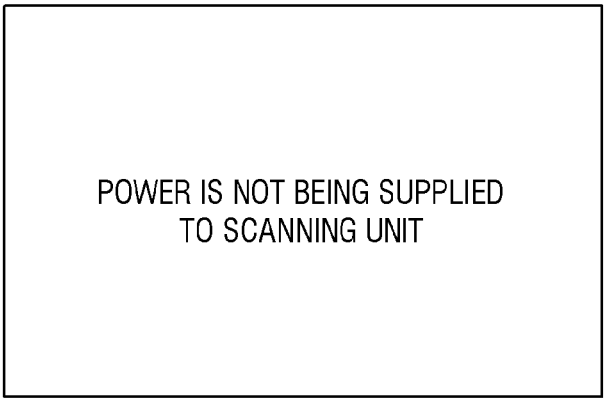
Figure 28:
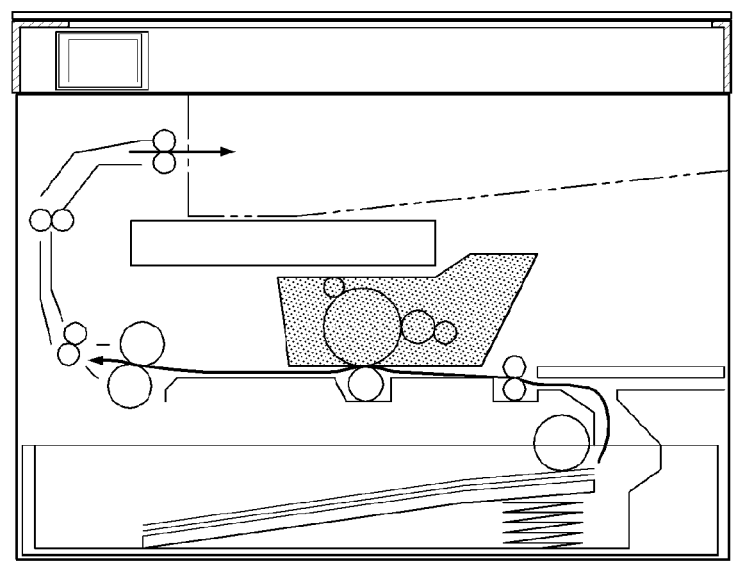

For example, as illustrated in FIG. 26, the display unit 2520 may provide a UI 2521 in the form of text, informing that power is not supplied to a specific function unit (for example, a scanning unit) from among the plurality of function units (2551-1, 2551-2, . . . , 2551-N). Alternatively, as illustrated in FIG. 27, the display unit 2520 may provide a UI 2522 in the form of text, displaying the power supply state of the plurality of function units (2551-1, 2551-2, . . . , 2551-N). In addition, as illustrated in FIG. 28, the display unit 2520 may provide a power supply state through a UI 2523 which schematically illustrates a sectional view of the image forming apparatus 2500 instead of a UI in the form of text. In this case, the display unit 2520 may display the function unit which supplies power differently from other function units. For instance, the display unit 2520 may display the function unit which supplies power in a different color or in a flickering manner.

In addition, if an error occurs in the image forming apparatus 2500, the display unit 2520 may provide information regarding the function unit where the error occurs, error information, and information regarding the power supply state of the function unit where the error occurs though a UI. For example, as illustrated in FIG. 29, the display unit 2520 may display a UI including a guidance message, "A paper is jammed in the paper feeding unit. Power supply to the paper feeding unit will be cut off, so please remove the jammed paper".

The power control switch unit 2530 performs a switching operation so that power can be supplied to at least some parts of the plurality of function units (2551-1, 2551-2, . . . , 2551-N) according to a power control signal provided from the controller 2510. In this case, the power control switch unit 2530 may use a power switch element, but this is only an example. The power control switch unit 2530 may use other switch elements.

The power supply unit 2540 provides power to each function unit of the image forming apparatus 2500. Specifically, the power supply unit 2540 may receive common AC power from outside, convert the AC power to DC power of an electric potential level which is appropriate for each component using elements such as a transformer, an inverter, and a rectifier, and output the converted power.

The function unit 2550 performs an image forming job according to a command from the controller 2510. In particular, the function unit 2550 comprises a plurality of function units (2551-1, 2551-2, . . . , 2551-N) in order to perform various image forming jobs such as a printing job, a copying job, a faxing job, and a scanning job. For example, the function unit 2550 may include a paper feeding unit, a pick-up unit, a transfer unit, a development unit, an electrification unit, a fusing unit, a paper discharging unit, and an exposure unit.

The power state sensor 2560 senses the power state of each component of the plurality of function units (2551-1, 2551-2, . . . , 2551-N) and provides the sensed power state information of the function unit 2550 to the controller 2510.

In this case, the power state sensor 2560 may be realized as a sensor to sense an on/off state of power, but this is only an example. The power state sensor 2560 may be realized as a circuit including a level shift which adjusts the power provided to each function unit 2550 to the voltage level of the controller 2510 again.

As described above, the power state and error state of the plurality of function units (2551-1, 2551-2, . . . , 2551-N) of the image forming apparatus 2500 may be provided via a UI, and thus a user may use the image forming apparatus safely and efficiently. Accordingly, the operation of waking up an image forming apparatus which is in a power saving mode to an operation mode unnecessarily can be prevented.

A program code for performing a job according to the various exemplary embodiments may be stored in a non-transitory computer readable medium. The non-transitory computer readable medium refers to a medium which may store data semi-permanently rather than storing data for a short time such as a register, a cache, or a memory, and may be readable by an apparatus. Specifically, the above-mentioned various applications or programs may be stored in a non-temporal recordable medium such as CD, DVD, hard disk, Blu-ray disk, USB, memory card, or ROM and provided therein.

Although a few embodiments of the present general inventive concept have been shown and described, it will be appreciated by those skilled in the art that changes may be made in these embodiments without departing from the principles and spirit of the general inventive concept, the scope of which is defined in the appended claims and their equivalents.

What is claimed is:

1. An image forming apparatus, comprising:
   a storage unit;
   an interface unit connected to an external host apparatus and at least one of other image forming apparatuses;
   an image forming unit to print image data received through the interface unit; and
   a controller which, when image data is received from the host apparatus when the image forming apparatus is in a normal mode, controls the image forming unit to perform an image forming job using the image data stored in the storage unit, and when the image data is received from the host apparatus when the image forming apparatus is in a power saving mode, controls the interface unit to transmit the image data to another image forming apparatus which is in the normal mode so that the another image forming apparatus which is in the normal mode performs an image forming job, and wherein the controller, when the image data is received from the host apparatus when the image forming apparatus is in the power saving mode, controls the interface unit to analyze information regarding other image forming apparatuses which are connected through the interface unit, search for image forming apparatuses which satisfy predetermined conditions, and transmit the image data to another image forming apparatus which operates in the normal mode from among the searched image forming apparatuses, wherein the predetermined conditions include at least one of a warming-up state, information on usage of consumables, amount of jobs to be performed, and an expected job processing time, wherein the controller checks an amount of jobs to be performed in the another image forming apparatus which is in the normal mode, and when the amount of jobs to be performed is less than a threshold level, controls the interface unit to transmit the image data to the another image forming apparatus which is in the normal mode; and when the amount of jobs to be performed exceeds a threshold level, converts the operation mode of the image forming apparatus from the power saving mode to the normal mode and performs the image forming job using the image data.

2. The image forming apparatus as claimed in claim 1, wherein:

the controller, when the image data is received from the host apparatus when the image forming apparatus is in the power saving mode, searches for another image forming apparatus which is in the normal mode from among other image forming apparatuses which are connected to the image forming apparatus via a network; and when a plurality of other image forming apparatuses which are in the normal mode are found, checks an amount of jobs to be performed in each of the image forming apparatuses and controls the interface unit to transmit the image data to another image forming apparatus having the least amount of jobs to be performed.

3. The image forming apparatus as claimed in claim 1, wherein:

the controller, when the image forming apparatus is in the power saving mode and the image data is received, searches for another image forming apparatus which is in the normal mode from among other image forming apparatuses which are connected to the image forming apparatus via a network; and when another image forming apparatus which is in the normal mode is not found, converts the operation mode of the image forming apparatus from the power saving mode to the normal mode and performs the image forming job using the image data.

4. The image forming apparatus as claimed in claim 1, wherein:

the controller, when the image forming apparatus is in the power saving mode and the image data is received from the host apparatus, searches for other image forming apparatuses which satisfy predetermined conditions stored in the storage unit from among other image forming apparatuses connected through the interface unit and controls the interface unit to transmit the image data to another image forming apparatus which operates in the normal mode from among the searched other image forming apparatuses; and wherein the conditions include at least one of a user authentication state, user setting information, apparatus location, and job performance capability.

5. The image forming apparatus as claimed in claim 1, wherein when the power saving mode comprises a plurality of power saving modes, and the image data is received while the image forming apparatus is in the power saving mode, the controller determines a type of the power saving mode of the image forming apparatus, and when it is determined that the current power saving mode of the image forming apparatus is a predetermined power saving mode, searches for another image forming apparatus which is in the normal mode from among other image forming apparatuses which are connected to the image forming apparatus via a network, and controls the interface unit to transmit the image data to the image forming apparatus which is in the normal mode.

6. The image forming apparatus as claimed in claim 1, wherein the transmitting image data to another image forming apparatus which is in the normal mode when the image forming apparatus is in the power saving mode is performed only when a predetermined mode form among multiple power saving modes is entered into.

7. The image forming apparatus as claimed in claim 1, wherein:

the storage unit comprises a first memory and a second memory; and the controller comprises a main CPU which operates in the normal mode and uses the first memory, and a sub CPU which operates in a power saving mode and uses the second memory.

8. The image forming apparatus as claimed in claim 1, further comprising:

a plurality of function units to perform one or more types of image forming jobs;

a power state sensor to sense a power supply state of the plurality of function units; and a display unit, wherein the controller determines a power supply state regarding the plurality of function units through the power state sensor and controls the display unit to generate and display a UI informing the determined power supply state.

9. A method of handling an image forming job in an image forming apparatus, comprising:

receiving image data to perform an image forming job;

performing an image forming job using the image data when the image forming apparatus is in a normal mode; and performing an image forming job by transmitting the image data to another image forming apparatus which is in the normal mode from among at least one image forming apparatus which is connected to the image forming apparatus when the image forming apparatus is in a power saving mode, wherein the performing of the image forming job by transmitting the image data to another image forming apparatus comprises:

when the image forming apparatus is in the power saving mode and the image data is received, analyzing information regarding other image forming apparatuses connected through the interface unit;

searching for other image forming apparatuses which satisfy predetermined conditions according to the analysis result; and transmitting the image data to another image forming apparatus which operates in the normal mode from among the searched other image forming apparatuses, wherein the predetermined conditions include at least one of a warming-up state, information on usage of consumables, amount of jobs to be performed, and an expected job processing time, wherein the performing of the image forming job by transmitting the image data to another image forming apparatus further comprises:

when another image forming apparatus which is in the normal mode is found, checking an amount of jobs to be performed in the another image forming apparatus which is in the normal mode; and when the amount of jobs to be performed is less than a threshold level, transmitting the image data to the another image forming apparatus which is in the normal mode, and when the amount of jobs to be performed exceeds a threshold level, converting the operation mode of the image forming apparatus from the power saving mode to the normal mode and performing the image forming job using the image data.

10. The method as claimed in claim 9, wherein the performing of the image forming job by transmitting the image data to another image forming apparatus further comprises:

when the image forming apparatus is in the power saving mode and the image data is received, searching for another image forming apparatus which is in the normal mode from among other image forming apparatuses which are connected to the image forming apparatus via a network, when a plurality of other image forming apparatuses which are in the normal mode are found, checking an amount of jobs to be performed in each of the image forming apparatuses; and selecting another image forming apparatus having the least amount of jobs to be performed and transmitting the image data to the another image forming apparatus having the least amount of jobs to be performed.

11. The method as claimed in claim 9, wherein the performing of the image forming job by transmitting the image data to another image forming apparatus further comprises:

searching for another image forming apparatus which is in the normal mode from among other image forming apparatuses which are connected to the image forming apparatus via a network; and when another image forming apparatus which is in the normal mode is not found, converting the operation mode of the image forming apparatus from the power saving mode to the normal mode and performing the image forming job using the image data.

12. The method as claimed in claim 9, wherein the performing of the image forming job by transmitting the image data to another image forming apparatus further comprises:

when the image forming apparatus is in the power saving mode and the image data is received, searching for other image forming apparatuses which satisfy predetermined conditions stored in the storage unit from among other image forming apparatuses connected to the image forming apparatus; and transmitting the image data to another image forming apparatus which operates in the normal mode from among the searched other image forming apparatuses, wherein the predetermined conditions include at least one of a user authentication state, user setting information, apparatus location, and job performance capability.

13. The method as claimed in claim 9, wherein when the power saving mode comprises a plurality of power saving modes, and the image data is received while the image forming apparatus is in the power saving mode, the performing of the image forming job by transmitting the image data to another image forming apparatus further comprises:

determining a type of the power saving mode of the image forming apparatus;

when it is determined that the current power saving mode of the image forming apparatus is a predetermined power saving mode, searching for another image forming apparatus which is in the normal mode from among other image forming apparatuses which are connected to the image forming apparatus; and transmitting the image data to the image forming apparatus which is in the normal mode.

14. The method as claimed in claim 9, wherein the performing of the image forming job by transmitting the image data to another image forming apparatus is carried out when a predetermined mode from among power saving modes of the image forming apparatus is entered into.

15. The method as claimed in claim 9, wherein:

the performing of the image forming job using the image data is performed by a main CPU which operates using a first memory; and the performing the image forming job by transmitting the image data to another image forming apparatus is performed by a sub CPU which operates using the second memory.

* * * * *